(12) United States Patent
Bosch et al.

(10) Patent No.: US 10,178,646 B2
(45) Date of Patent: Jan. 8, 2019

(54) SYSTEM AND METHOD TO FACILITATE SLICE MANAGEMENT IN A NETWORK ENVIRONMENT

(71) Applicant: CISCO TECHNOLOGY, INC., San Jose, CA (US)

(72) Inventors: Hendrikus G. P. Bosch, Aalsmeer (NL); Humberto J. La Roche, Ocean, NJ (US); Aeneas Sean Dodd-Noble, Andover, MA (US); Sape Jurriën Mullender, Amsterdam (NL); Timothy P. Stammers, Raleigh, NC (US); Konstantin Livanos, Naperville, IL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/486,143

(22) Filed: Apr. 12, 2017

(65) Prior Publication Data
US 2018/0302877 A1 Oct. 18, 2018

(51) Int. Cl.
*H04W 68/02* (2009.01)
*H04W 8/08* (2009.01)
*H04L 29/06* (2006.01)
*H04W 88/02* (2009.01)

(52) U.S. Cl.
CPC ......... *H04W 68/02* (2013.01); *H04L 63/0281* (2013.01); *H04L 63/0876* (2013.01); *H04L 63/123* (2013.01); *H04W 8/08* (2013.01); *H04L 63/0884* (2013.01); *H04W 88/02* (2013.01)

(58) Field of Classification Search
CPC .................................................... H04W 68/02
See application file for complete search history.

(56) References Cited

U.S. PATENT DOCUMENTS

| | | |
|---|---|---|
| 3,629,512 A | 12/1971 | Yuan |
| 4,769,811 A | 9/1988 | Eckberg et al. |
| 5,408,231 A | 4/1995 | Bowdon |
| 5,491,690 A | 2/1996 | Alfonsi et al. |
| 5,600,638 A | 2/1997 | Bertin et al. |
| 5,687,167 A | 11/1997 | Bertin et al. |
| 6,115,384 A | 9/2000 | Parzych |
| 6,167,438 A | 12/2000 | Yates et al. |

(Continued)

FOREIGN PATENT DOCUMENTS

WO 2017058067 A1 4/2017

*Primary Examiner* — Mazda Sabouri
(74) *Attorney, Agent, or Firm* — Patterson + Sheridan, LLP

(57) ABSTRACT

A method is provided in one example embodiment and may include receiving, by a mobility management frontend, an attach request for a user equipment (UE) to attach the UE to a core network slice type for a mobile core Software Defined Network (SDN) infrastructure, wherein a plurality of core network slice types are available for the mobile core SDN infrastructure to receive traffic from a plurality of UEs; determining a particular core network slice type within the mobile core SDN infrastructure to serve the UE based on subscriber information associated with the UE; selecting a particular slice instance of the particular core network slice type to receive traffic for the UE; and forwarding traffic for the UE between a Radio Access Network (RAN) and the particular slice instance by the mobility management frontend.

17 Claims, 13 Drawing Sheets

(56) References Cited

U.S. PATENT DOCUMENTS

| | | |
|---|---|---|
| 6,400,681 B1 | 6/2002 | Bertin et al. |
| 6,661,797 B1 | 12/2003 | Goel et al. |
| 6,687,229 B1 | 2/2004 | Kataria et al. |
| 6,799,270 B1 | 9/2004 | Bull et al. |
| 6,888,828 B1 | 5/2005 | Partanen et al. |
| 6,993,593 B2 | 1/2006 | Iwata |
| 7,027,408 B2 | 4/2006 | Nabkel et al. |
| 7,062,567 B2 | 6/2006 | Benitez et al. |
| 7,095,715 B2 | 8/2006 | Buckman et al. |
| 7,096,212 B2 | 8/2006 | Tribble et al. |
| 7,139,239 B2 | 11/2006 | McFarland |
| 7,165,107 B2 | 1/2007 | Pouyoul et al. |
| 7,197,008 B1 | 3/2007 | Shabtay et al. |
| 7,197,660 B1 | 3/2007 | Liu et al. |
| 7,209,435 B1 | 4/2007 | Kuo et al. |
| 7,227,872 B1 | 6/2007 | Biswas |
| 7,231,462 B2 | 6/2007 | Bethaud et al. |
| 7,333,990 B1 | 2/2008 | Thiagarajan |
| 7,443,796 B1 | 10/2008 | Albert et al. |
| 7,458,084 B2 | 11/2008 | Zhang et al. |
| 7,486,622 B2 | 2/2009 | Regan et al. |
| 7,536,396 B2 | 5/2009 | Johnson et al. |
| 7,558,261 B2 | 7/2009 | Arregoces et al. |
| 7,567,504 B2 | 7/2009 | Darling et al. |
| 7,571,470 B2 | 8/2009 | Arregoces et al. |
| 7,573,879 B2 | 8/2009 | Narad |
| 7,610,375 B2 | 10/2009 | Portolani et al. |
| 7,643,468 B1 | 1/2010 | Arregoces et al. |
| 7,644,182 B2 | 1/2010 | Banerjee |
| 7,647,422 B2 | 1/2010 | Singh et al. |
| 7,657,940 B2 | 2/2010 | Portolani et al. |
| 7,668,116 B2 | 2/2010 | Wijnands et al. |
| 7,684,321 B2 | 3/2010 | Muirhead et al. |
| 7,738,469 B1 | 6/2010 | Shekokar et al. |
| 7,814,284 B1 | 10/2010 | Glass et al. |
| 7,831,693 B2 | 11/2010 | Lai |
| 7,860,095 B2 | 12/2010 | Forissier et al. |
| 7,860,100 B2 | 12/2010 | Khalid et al. |
| 7,895,425 B2 | 2/2011 | Khalid et al. |
| 7,899,012 B2 | 3/2011 | Ho et al. |
| 7,899,861 B2 | 3/2011 | Feblowitz et al. |
| 7,907,595 B2 | 3/2011 | Khanna et al. |
| 7,983,174 B1 | 7/2011 | Monaghan et al. |
| 7,990,847 B1 | 8/2011 | Leroy et al. |
| 8,000,329 B2 | 8/2011 | Fendick et al. |
| 8,018,938 B1 | 9/2011 | Fromm et al. |
| 8,094,575 B1 | 1/2012 | Vadlakonda |
| 8,166,465 B2 | 4/2012 | Feblowitz et al. |
| 8,180,909 B2 | 5/2012 | Hartman et al. |
| 8,195,774 B2 | 6/2012 | Lambeth et al. |
| 8,280,354 B2 | 10/2012 | Smith et al. |
| 8,281,302 B2 | 10/2012 | Durazzo et al. |
| 8,291,108 B2 | 10/2012 | Raja et al. |
| 8,305,900 B2 | 11/2012 | Bianconi |
| 8,311,045 B2 | 11/2012 | Quinn et al. |
| 8,316,457 B1 | 11/2012 | Paczkowski et al. |
| 8,830,834 B2 | 9/2014 | Sharma et al. |
| 8,904,037 B2 | 12/2014 | Haggar et al. |
| 9,001,827 B2 | 4/2015 | Appenzeller |
| 9,071,533 B2 | 6/2015 | Hui et al. |
| 2013/0308564 A1* | 11/2013 | Jain ............... H04B 15/00 370/329 |
| 2016/0234730 A1* | 8/2016 | John ............... H04W 76/10 |
| 2016/0353465 A1* | 12/2016 | Vrzic ............... H04W 12/06 |
| 2017/0099612 A1* | 4/2017 | Salot ............... H04W 28/0215 |
| 2017/0142591 A1* | 5/2017 | Vrzic ............... H04W 24/08 |
| 2017/0245316 A1* | 8/2017 | Salkintzis ........... H04W 76/10 |
| 2017/0374613 A1* | 12/2017 | Ianev ............... H04W 76/18 |
| 2018/0077744 A1* | 3/2018 | Ianev ............... H04W 76/12 |

* cited by examiner

SESSION CORRELATION TABLE 220

| RF ELEMENT/UE SESSION ID ENTRY 222.1 | MMF/UE SESSION ID ENTRY 224.1 | MME SERVER/UE SESSION ID ENTRY 226.1 |
|---|---|---|
| UE S1AP ID-1001 | UE S1AP ID-2001 | UE S1AP ID-3001 |
| UE S1AP ID-1002 | UE S1AP ID-2002 | UE S1AP ID-3002 |
| ⋮ | ⋮ | ⋮ |
| UE S1AP ID-100Y | UE S1AP ID-200Y | UE S1AP ID-300Y |

RF ELEMENT/UE SESSION ID ARRAY 222 | MMF/UE SESSION ID ARRAY 224 | MME SERVER/UE SESSION ID ARRAY 226

FIG. 2C

PAGING CORRELATION TABLE 230

| RF ELEMENT GLOBAL ID ENTRY 232.1 | PAGING LOCATION LIST ENTRY 234.1 |
|---|---|
| RF Element 104.1 Global ID | {$LOC_1, \ldots LOC_M$} |
| RF Element 104.2 Global ID | {$LOC_{M+1}, \ldots LOC_N$} |
| ⋮ | ⋮ |
| RF Element 104.X Global ID | {$LOC_{N+1}, \ldots LOC_P$} |

RF ELEMENT GLOBAL ID ARRAY 232 | PAGING LOCATION LIST ARRAY 234

FIG. 2D

RF ELEMENT/MMF CORRELATION TABLE 240

| RF ELEMENT GLOBAL ID ENTRY 242.1 | MMF ID ENTRY 244.1 |
|---|---|
| {RF Element 104.1 Global ID, RF Element 104.2 Global ID} | MMF 124 ID |
| ⋮ | ⋮ |
| {RF Element Global ID List} | MMF Z ID |

RF ELEMENT LIST ARRAY 242 | MMF ID ARRAY 244

FIG. 4A

S1AP-Initial-UE Message 410a
(RF ELEMENT to MMF)

| IE/Group Name | |
|---|---|
| Message Type | ← 411 |
| RF ELEMENT/UE S1AP ID-1001 | ← 412 |
| NAS-PDU | ← 413 |
| | ← 414 |

FIG. 4B

S1AP-Initial-UE Message 410b
(MMF to MME SERVER)

| IE/Group Name | |
|---|---|
| Message Type | ← 411 |
| MMF/UE S1AP ID-2001 | ← 412 |
| NAS-PDU | ← 413 |
| | ← 414 |

FIG. 4C

S1AP-Initial-Context-Setup Message 434a
(MME SERVER to MMF)

| IE/Group Name | ← 431 |
|---|---|
| Message Type | ← 432 |
| MMF/UE S1AP ID-2001 | ← 433.1 |
| MME/UE S1AP ID-3001 | ← 433.2 |
| NAS-PDU | ← 434 |

FIG. 4D

S1AP-Initial-Context-Setup Message 434b
(MMF to RF ELEMENT)

| IE/Group Name | ← 431 |
|---|---|
| Message Type | ← 432 |
| RF ELEMENT/UE S1AP ID-1001 | ← 433.1 |
| MMF/UE S1AP ID-2001 | ← 433.2 |
| NAS-PDU | ← 434 |

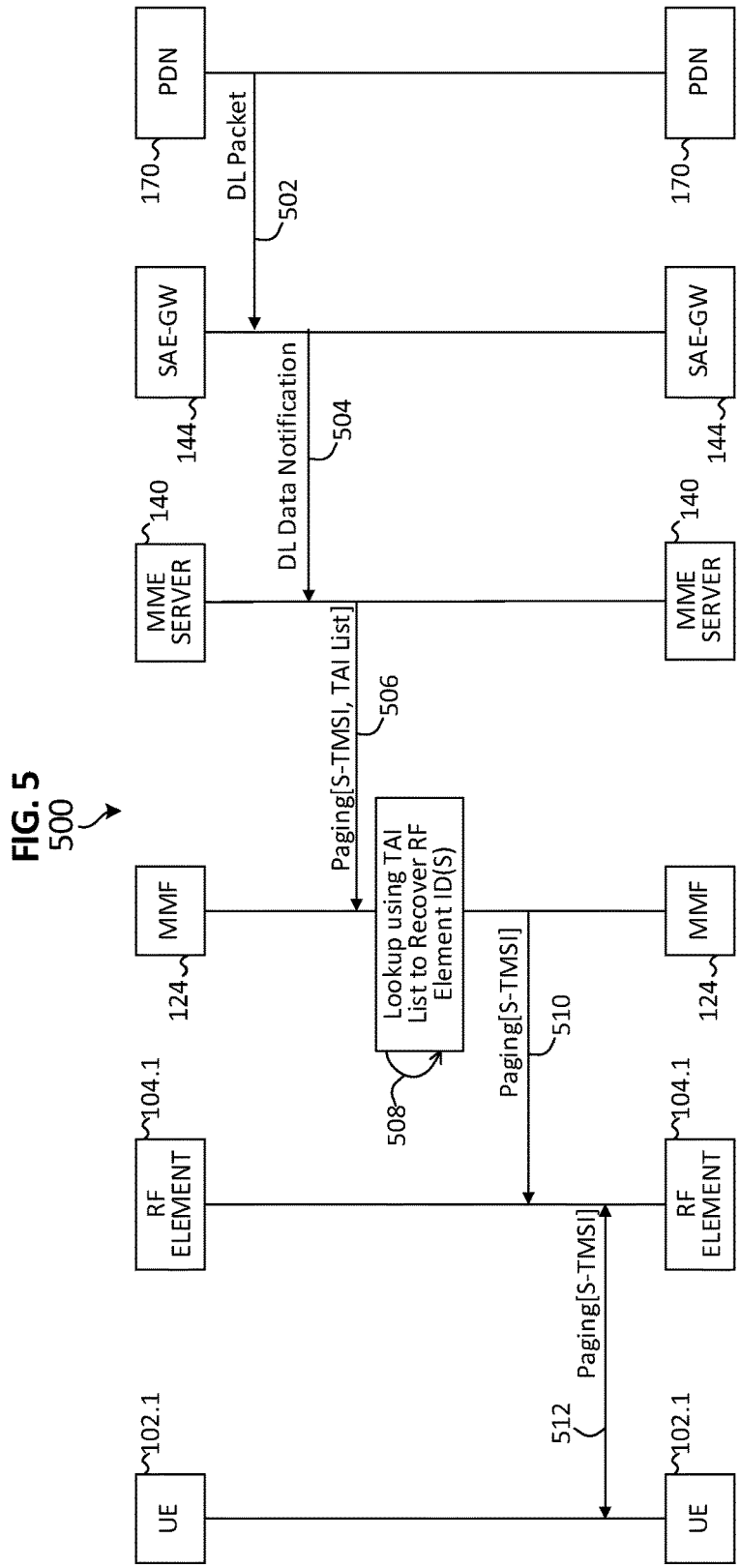

600

1100

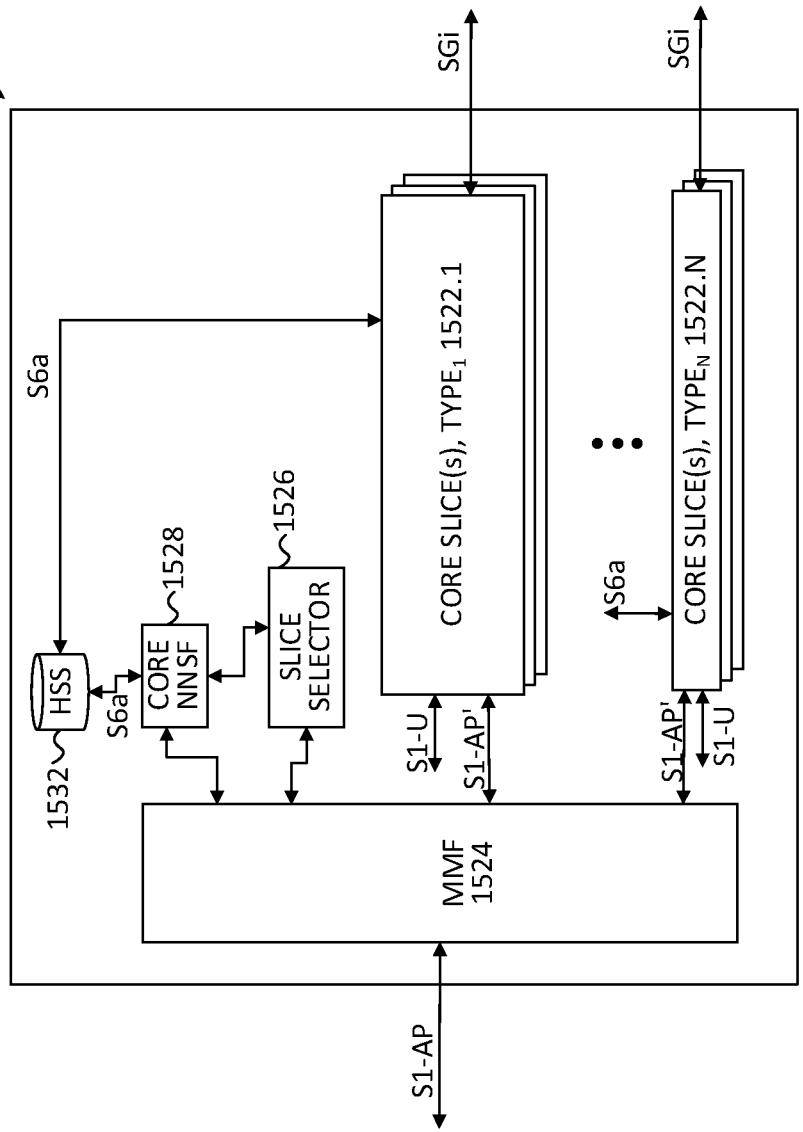

SYSTEM AND METHOD TO FACILITATE SLICE MANAGEMENT IN A NETWORK ENVIRONMENT

TECHNICAL FIELD

This disclosure relates in general to the field of computer networking, and more particularly, to a system and method to facilitate slice management in a network environment.

BACKGROUND

Mobile networking architectures have grown increasingly complex in communication environments. In some cases, mobile network architectures can include multiple core network types that can support different radio access types, different core network functions and different services for user equipment present in a network environment. In some instances, different core network types can be deployed in a virtualized network environment using a virtualized 'slicing' architecture to realize functionality for different core network types. As the number of user equipment and core network types increases and as virtualized network environments become more prevalent for mobile networking deployments, efficient management of communication resources becomes more critical. Accordingly, there are significant challenges in managing slices for a network environment.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 2B-2D are simplified schematic diagrams illustrating example details that can be associated with example data structures that can be maintained by the MMF of FIG. 2A in accordance with one potential embodiment;

FIGS. 4A-4D are simplified schematic diagrams illustrating example messages that can be exchanged to facilitate the slice management of FIGS. 3A-3B in accordance with one potential embodiment;

FIG. 5 is a simplified flow diagram illustrating other example operations and interactions that can be performed to facilitate paging in accordance with one potential embodiment;

FIGS. 10-12 are simplified block diagrams illustrating other example details that can be associated with various potential embodiments.

DETAILED DESCRIPTION OF EXAMPLE EMBODIMENTS

Overview

Figure 1:
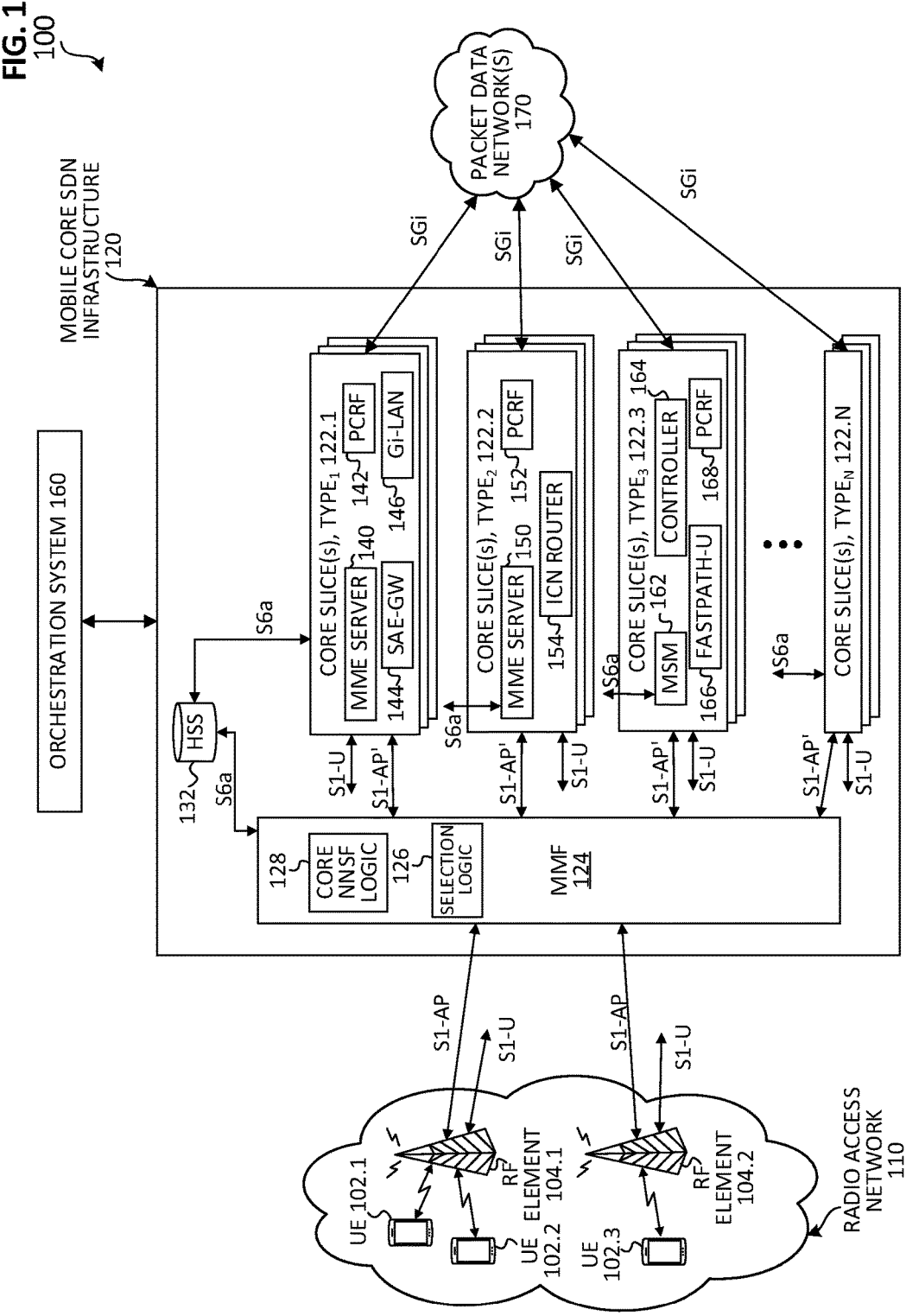
FIG. 1 is a simplified block diagram illustrating a communication system that can facilitate slice management according to one embodiment of the present disclosure.

A method is provided in one example embodiment receiving, by a mobility management frontend, an attach request for a user equipment (UE) to attach the UE to a core network slice type for a mobile core Software Defined Network (SDN) infrastructure, wherein a plurality of core network slice types are available for the mobile core SDN infrastructure to receive traffic from a plurality of UEs; determining a particular core network slice type within the mobile core SDN infrastructure to serve the UE based on subscriber information associated with the UE; selecting a particular slice instance of the particular core network slice type to receive traffic for the UE; and forwarding traffic for the UE between a Radio Access Network (RAN) and the particular slice instance by the mobility management frontend.

In some cases, determining the particular core network slice type can further include retrieving, by the mobility management frontend, the subscriber information associated with the UE from a Home Subscriber Server (HSS); and determining the particular core network slice type based on a UE-Usage-Type parameter included in the subscriber information that identifies the particular core network slice type to be selected for the UE. In some cases, selecting the particular slice instance of the particular core network slice type can be based, at least in part, on loading for each of a plurality of slice instances associated with the particular core network slice type.

In some cases, the method can further include decrypting a Non-Access Stratum (NAS) message received by the mobility management frontend from the UE; and forwarding the decrypted NAS message to a Mobility Management Entity (MME) server associated with the particular slice instance. In still some cases, the method can further include receiving an unencrypted Non-Access Stratum (NAS) message by the mobility management frontend from a Mobility Management Entity server associated with the particular slice instance; encrypting the NAS message; and forwarding the encrypted NAS message toward the UE.

In still some cases, the method can further include maintaining a plurality of data structures by the mobility management frontend, wherein the plurality of data structures comprise: a session correlation table identifying, for each of a particular UE of the plurality of UEs, a first session identifier (ID) assigned to the particular UE by a Radio Frequency (RF) element of the RAN to which the particular UE is connected, a second session ID assigned to the UE by the mobility management frontend, and a third session ID assigned to the particular UE by a Mobility Management Entity server associated with the particular slice instance; and a paging correlation table identifying, for each RF element of a plurality of RF elements of the RAN, a paging location list associated with each RF element.

In still some cases, the method can include receiving a paging message by the mobility management frontend from a Mobility Management Entity (MME) server associated with the particular slice instance, wherein the paging message comprises an identifier for the UE and paging location information associated with the UE; determining one or more RF elements of the RAN that can be serving the UE from the paging correlation table based on the paging location information received in the paging message; and forwarding the paging message to the one or more determined RF elements, wherein the forwarded paging message comprises the identifier for the UE. In some instances, the plurality of data structures can further include a mobility management frontend correlation table identifying, for each of a plurality of mobility management frontends, a list identifying a plurality of RF elements of the RAN served by each mobility management frontend.

Example Embodiments

For purposes of understanding certain embodiments of systems and architectures disclosed herein, it is important to appreciate the technologies and data that may be associated with network communications for 3rd Generation Partnership Project (3GPP) mobile system architectures. The following foundational information may be viewed as a basis from which the present disclosure may be properly explained.

As referred to herein in this Specification, the term 'plane' can refer to a separation of traffic that can traverse a network. Three planes can typically be found in communication networks including: a data-plane, a control-plane and a management-plane. The data-plane typically carries or forwards user traffic, while the control-plane typically carries signaling traffic used to provide routing information for user traffic and the management-plane, a subset of the control plane, typically carries administrative traffic. As referred to herein in this Specification, the terms 'user-plane', 'data-plane' and 'user data-plane' can be used interchangeably.

As referred to herein in this Specification, the terms 'virtual machine', 'virtualized network function' and 'virtualized network functionality' can encompass an emulation of a computer system, and/or computing platform operating based on the computer architecture and functions of a real or hypothetical computer, with particular embodiments involving specialized hardware, software, or a combination of both. In various embodiments, a virtualized network function (VNF), a virtual machine (VM), a virtualized network function component (VNFC), virtualized functionality ,and/or any virtualized network controller, element, module, aggregator, combinations thereof or the like as described herein may execute (e.g., be instantiated to perform one or more operation(s)) via a hypervisor-based virtualization or a container-based virtualization of one or more compute node(s) using the compute node(s)' hardware (e.g., processor and memory element), software, and/or operating system for a given virtualized network environment. In some cases, a Physical Network Function (PNF) may be referenced herein in this Specification. A PNF is typically associated with a hardware radio head, which can be configured with one or more transmitters and receivers (and other associated hardware and/or software functionality) to facilitate over-the-air (OTA) Radio Frequency (RF) communications.

Compute node(s) having hardware and software resources that can be abstracted into one or more logical layers can also be used to facilitate building and deploying Software Defined Network (SDN) architectures for virtualized network environments. Generally, SDN architectures provide an approach to building and deploying computer networks, networking equipment and software that separates and abstracts the control-plane and data-plane of networking systems. SDN decouples the control-plane that makes decisions about where traffic is sent from the underlying data-plane that forwards traffic to a selected destination. SDN allows network administrators, operators, etc. to manage network services through abstraction of lower level functionality into a virtualized network environment. In various embodiments, a compute node can be implemented as: a data center compute node such as a server, rack of servers, multiple racks of servers, etc. for a data center; or a cloud compute node, which can be distributed across one or more data centers.

3GPP is currently defining, through Technical Specifications Release 13 (Rel-13), a 5th Generation (5G) mobile system that it can handle a wide variety of radio technologies and can be used in many different environments or, more generally 'use-cases'. From a radio networking perspective, current mobile broadband (MBB) mobile radio devices or user equipment (UEs) (e.g., 3rd Generation (3G) and 4th Generation (4G) devices) are included in the scope of a 5G mobile system, but this network, which will be ubiquitously available, can be also augmented with other radio access networks (RANs) or systems such as, for example, high performance Institute of Electrical and Electronic Engineers (IEEE) 802.11 (e.g., Wi-Fi), millimeter wave (mm.wave), LTE-Advanced (LTE-A), licensed assisted access (LAA) and other types of radio access systems. These additional radio access systems are primarily targeted for high performance networking. For instance, mm.wave radio access systems typically provide extremely high data rates but also have significant coverage challenges.

From a use-case perspective, 5G systems need to cater to a wide variety of uses. Traditional (e.g., smart-phone) mobile devices will need to be supported other use-cases should be considered including, but not limited to, use-cases involving fixed-access replacement (e.g., residential gateway) with linear and/or replay television (TV) functions; potential drone networking with high speed video surveillance use-cases; and/or Internet-of-Things (IoT), and/or Cellular IoT (CIoT) use-cases supporting a range of devices from simple measurement devices to high bandwidth video uses for automotive, home, and/or industrial use.

From a protocol perspective, traditional Internet Protocol IP traffic will need to be supported, as well as Short Message Service (SMS) and text record type (TXT-type) communication channels; multicast; and also experimental Information-Centric Networking (ICN) may need to be supported. Each use-case will also need to cater to its own charging, subscriber management and operational infrastructure.

Thus, it is unlikely that a single mobile packet core terminating 5G access connections will meet the needs of all potential use-cases. Customization for radio technologies and use-cases is important for 5G. For example, multicast or multicast equivalent technologies do not require mobility anchors, fixed line replacement solutions require fixed line access termination, mm.wave radio will likely benefit from multipath functionality, and industrial, home and automotive IoT solutions are likely more control-plane heavy relative to other types of use-cases. Moreover, each of these use-cases can have different cost structures and charging models, which can lead to specialization in a mobile system deployment.

The use of a wide set of radio technologies and use-cases specifically for 5G technologies, but more generally for all (cellular) systems, calls for differentiation of mobile core networks. One key to enable differentiation of mobile core networks is the use of core network slices that can (a) provide signaling procedures for specific use-cases and (b) provide data-plane connectivity between radio systems and larger networks such as, but not limited to, the Internet, IoT, and/or fixed wireless broadband networks.

Referring to FIG. 1, FIG. 1 is a simplified block diagram illustrating a communication system 100 that can, in various embodiments as described herein, provide a system and method to facilitate dynamic slicing in a network environment to support operations involving multiple core network slice types for a variety of architectures. For example, in at least one embodiment, communication system 100 can support operations for multiple network slices in 3GPP Rel-13 architectures and subsequent (e.g., 3GPP Release 14, etc.) architectures that may incorporate Dedicated Core (DÉCOR) Network (DCN) and/or Multi-Operator Core Network (MOCN) techniques (e.g., as defined in 3GPP Technical Specification (TS) 23.401, 23.251, etc.). In another embodiment, communication system 100 can support operations for multiple core network slices in legacy (e.g., pre- or non-DÉCOR and pre-Rel-13) architectures. The ability to provide support for legacy architectures is important as it enables a network operator to realize the benefits of network slicing without a need to upgrade to new infrastructures (e.g., RAN and core).

Communication system 100 can include a Radio Access Network (RAN) 110, a mobile core Software Defined Network (SDN) infrastructure 120, an orchestration system 160, and one or more Packet Data Network(s) (PDN(s)) 170. RAN 110 can include users operating user equipment (UE) 102.1-102.3 and RF elements 104.1-104.2. Mobile core SDN infrastructure 120 can include a Mobility Management Frontend (MMF) 124, a number of slice(s) of each of a number of core slice types, $Type_1$-$Type_N$ 122.1-122.N, where 'N' can be any number of slice types that may be configured by a network operator for mobile core SDN infrastructure 120, and a Home Subscriber Server (HSS) 132. For the embodiment of FIG. 1, MMF 124 can be provisioned with selection logic 126 and Core Non-Access Stratum (NAS) Node Selection Function (NNSF) logic 128. In some embodiments, however, a Core NNSF and/or slice selector can be provisioned external to MMF 124.

As noted, each core slice Type 122.1-122.N can include any number of slice(s), also referred to herein as 'slice instance(s)', such that each slice instance for a given core slice Type can include an instantiation of the network elements, functions, nodes, etc. that may configured for the given core slice Type. As referred to herein in this Specification, a core slice Type and a slice instance of the given slice Type can be referred to collectively using the terms 'core slice Type/slice', 'core slice Type/slice instance', 'core slice Type/instance' and variations thereof.

RAN 110 can provide a communications interface between UE 102.1-102.3 and mobile core SDN infrastructure 120. In various embodiments, RAN 110 may include 3GPP access networks such as, for example, Global System for Mobile Communications (GSM), General Packet Radio Service (GPRS), Enhanced Data Rates for GSM Evolution (EDGE) Radio Access Network (GERAN), generally referred to as 2nd Generation (2G); Universal Mobile Telecommunications System (UMTS) Terrestrial Radio Access Network (UTRAN), High Speed Packet Access (HSPA/HSPA+), generally referred to as 3G; evolved-UTRAN (E-UTRAN), generally referred to as 4G, Long Term Evolution (LTE) or LTE-Advanced (LTE-A)/LTE-A Pro; and/or 5G New Radio (NR) access network or beyond. In various embodiments, RAN 110 may include non-3GPP IP access networks such as digital subscriber line (DSL), Cable, a wireless local area network (WLAN) (e.g., 802.11 Wi-Fi), Worldwide Interoperability for Microwave Access (Wi-MAX)) or the Internet. In various embodiments, any of RF elements 104.1-104.2 can be configured as a Node B / Radio Network Controller (nodeB/RNC), an evolved Node B (eNodeB), a Home nodeB (HNB), a Home eNodeB (HeNB), a residential gateway (RG) or any other base station or RF element as may be defined by 3GPP standards to facilitate OTA RF communications with a number of UE and interfacing with mobile core SDN infrastructure 120. Although only three UE and two RF elements are shown in FIG. 1, it should be understood that any number of UE and RF termination points can be present in communication system 100 in accordance with embodiments described herein.

In various embodiments, PDN(s) 170 can include, but not be limited to, any combination of the Internet, managed video, ICN services, IP Multimedia Subsystem (IMS) and/or any other Access Point Name (APN) to which a mobile core slice may connect.

UE 102.1-102.2 can interface with (e.g., can connect to and be served by) RF element 104.1 using OTA RF communications and UE 102.3 can interface with RF element 104.2 using OTA RF communications. In various embodiments, a subscriber associated with a given UE or the UE itself can be identified using one or more identifiers such as, for example, an International Mobile Subscriber Identity (IMSI), a Temporary IMSI (T-IMSI), a Serving Temporary Mobile Subscriber Identity (S-TMSI), a Globally Unique Temporary UE Identity (GUTI) GUTI or a Mobile Station International Subscriber Directory Number (MSISDN).

A GUTI can include a 12-bit Mobile Country Code (MCC), an 8 or 12-bit Mobile Network Code (MNC), a 16-bit MME Group Identity (MMEGI), an 8-bit MME code (MMEC) and a 32-bit MME Temporary Mobile Subscriber Identity (M-TMSI) that can be assigned by the MME serving a UE to identify the UE within the MME. The MMEC and M-TMSI can be combined form a System Architecture Evolution (SAE) TMSI (S-TMSI) that can be used to locally identify a UE within an MME group. The MCC and MNC can be combined to form a Public Land Mobile Node (PLMN) ID that can be used identify the PLMN in which an MME is deployed and the MMEGI and MMEC can be combined to form an MME Identifier (MMEI) that can be used to identify an MME within the PLMN. The PLMN ID and MMEI can be combined to form a Globally Unique MME Identity (GUMMEI) that can be used to identify an MME globally.

Each RF element 104.1-104.2 can interface with MMF 124 using a respective S1-Application Protocol (S1-AP) interconnection for control-plane communications. Each RF element 104.1-104.2 can interface with each core slice Type/slice via a respective S1-User-plane (S1-U) interconnection. For control-plane communications, MMF 124 can further interface with each core slice Type/slice using an enhanced S1-AP interface, referred to herein as S1-AP-prime (S1-AP'). The S1-AP' interface can facilitate one Stream Control Transmission Protocol (SCTP) connection for an MME server of each slice Type/slice. Each respective core slice Type/slice can interface with PDN(s) 170 via a respective SGi interface. For the embodiment of FIG. 1, MMF 124 can interface with HSS 132 via a 3GPP S6a interface.

MMF 124 can represent a stateful proxy that appears as an MME to each RF element 104.1-104.2 of the RAN 110 and can be an SDN control point within the mobile core SDN infrastructure 120 to implement fast-path signaling path between RAN 110 and each slice Type/slice of mobile core SDN infrastructure 120. The fast-path signaling provided via MMF 124 can be used to connect signaling end-points after a subscriber's flow has been classified and load balanced to a slice instance of a particular slice Type/slice. In various embodiments, MMF 124 can provide other functionality including, but not limited to: maintaining a RAN perspective of each MME server of an MME server pool (e.g., a pool of MME servers instantiated for each slice Type(s) in mobile core SDN infrastructure 120) such that the MME server of each slice Type/slice has no RAN visibility, rather the MMF 124 maintains RAN visibility for the pools of MME servers for each core slice $Type_{1-N}$; providing GUTI assignment; offloading traditional MME functionality such as security operations and/or procedures (e.g., UE authentication, Non-Access Stratum (NAS) signaling, decrypting/encrypting for NAS messages, UE security context, etc.), S1AP and/or NAS signaling intercept, NAS transport paging, and/or S1AP Management procedures (e.g., S1 setup, eNB Configuration Update, MME overload, etc. as defined in 3GPP TS 36.413).

Orchestration system 160 can interface with mobile core SDN infrastructure 120 to manage the dynamic instantiation of slices for each core slice Type (e.g., adding and/or removing slice(s) and/or slice Type(s)). In one embodiment, a first core slice Type, as represented by core slice $Type_1$ 122.1, can be associated with a MBB slice type; a second core slice type, as represented by core slice $Type_2$ 122.2, can be associated with an ICN slice type; and a third core slice type, as represented by core slice $Type_3$ 122.3, can be associated with a mm.wave slice type. For purposes of discussions provided herein, each core slice Type is referenced in relation to a particular Type number (e.g., 1, 2, 3, etc.); however, the numbering is provided for illustrative purposes only. It should be understood that any number of core slice Types, in any order, can be configured for communication system 100 and thus, are clearly within the broad scope of the teachings of the present disclosure.

In at least one embodiment, each slice(s) of core slice $Type_1$ 122.1, which can be associated with MBB Type slice(s), can include an MME server 140, a Policy and Charging Rules Function (PCRF) 142, a System Architecture Evolution Gateway (SAE-GW) 144, and a Gi-Local Area Network (Gi-LAN) 146. In some embodiments, each slice(s) of core slice $Type_1$ 122.1 can include multiple instantiations of SAE-GWs 144 and multiple instantiations of Gi-LANs 146.

In the context of communication system 100, certain MME features are offloaded to MMF 124 (e.g., security, S1-AP management procedures, etc., as noted herein); thus, an MME server (e.g., MME server 140, etc.) for a particular slice Type/slice within communication system 100 may have less functionality than a typical MME may perform in traditional 3GPP architectures. MME servers for various core slice Types can perform MME-like functionality, which can include receiving decrypted NAS messaging from MMF 124; send un-encrypted NAS messaging to the MMF 124; performing EPS Mobility Management (EMM) and EPS Session Management (ESM) procedures (e.g., performing SGW/PGW session management (SM) procedures, maintaining UE context, performing bearer activation and deactivation procedures, providing tracking area list management, etc.), combinations thereof or the like.

HSS 132 may include one or more databases containing user-related and subscription-related information to facilitate functionalities such as mobility management, call and session establishment support, user authentication and access authorization, core slice Type selection, combinations thereof or the like as discussed for various embodiments described herein.

As referred to herein, the terms 'SGW' and 'S-GW' can be used interchangeably and the terms 'PGW' and 'P-GW' can be used interchangeably. In some embodiments, a Serving GPRS Support Node (SGSN) can be configured for an MBB slice type; an SGSN can provide similar functionality as an MME for legacy RANs such as UTRAN or GERAN. An SAE-GW typically provides both SGW and PGW functionality. An SGW is a network element that can provide functionality for managing user mobility and interfaces with RAN nodes (e.g., RF elements). A PGW is a network element that provides IP connectivity access network (IP-CAN) session connectivity to external PDNs. A PCRF can aggregate information to and from a mobile core network, operational systems, and/or other sources in real-time; can support the creation of policy charging and control (PCC) rules; and can automatically make policy decisions for subscriber flows such as, for example, quality of service (QoS) level decisions and charging rule decisions. A Gi-LAN can include services and/or applications that can operate on subscriber IP flows between a PGW and one or more PDNs. In various embodiments, Gi-LAN services and functions can include, but not be limited to, Deep Packet Inspection (DPI) engines, Network Address and/or Port Translation (NA(P)T) functions, optimizers (e.g., web, video, Transmission Control Protocol (TCP), etc.), firewall functions (e.g., Uniform Resource Locator (URL) blocking functions, combinations thereof or any other function or application that may be performed in a mobile core network environment.

In at least one embodiment, each slice(s) of core slice $Type_2$ 122.2 can be associated with ICN type slice(s) and can include an MME server 150, a PCRF 152 and one or more ICN router(s) 154. In general, an ICN router can provide packet forwarding capabilities using name-prefix information included in Interest packets or Data packets between consumer nodes and producer nodes based on lookups on various data structures including, but not limited to, a Content Store (CS), a Pending Interest Table (PIT) and/or a Forwarding Information Base (FIB). The data structures can provide forwarding functionality by matching name-prefix information with one or more interfaces, typically referred to as 'faces', provisioned for the ICN router.

In at least one embodiment, each slice(s) of core slice $Type_3$ 122.3 can be associated with mm.wave type slice(s), which can include a Millimeter Wave Slice Manager (MSM) 162, a controller 164, a user-plane fastpath (fastpath-U) 166 and a PCRF 168. An MSM can perform operations similar to an MME. In general, mm.wave type slices can handle session and connectivity management for mm.wave access networks.

For data-plane connectivity, each dynamic slice can, in some embodiments, have multiple instances of S- and P-GW functional elements, may support Control- and User-Plane Split (CUPS) architectures, may support ICN-based routers, may support Machine Type Communication (MTC) servers for IoT or any other type of mobile packet core data-plane functionality, may support their own PCRF instances and may have connectivity with an HSS and/or SPR. Moreover, in various embodiments, mobile packet core data-plane functions may run in a centralized location as physical or virtual entities, or may be distributed and execute even inside RAN infrastructures.

During operation, orchestration system 160 can provide dynamic slice orchestration for mobile core SDN infrastructure 120 for managing dynamic slice(s), which can include core slice Type instantiation, slice instantiation, slice termination, slice monitoring, combinations thereof or the like. In one embodiment, a network operator can define a layout of dynamic slice Types, slices associated with each slice Type, and associated Key Performance Indicators (KPIs) for the slice Type(s). The defined information, parameters, etc. can be codified into a model, which can be sent to or configured for orchestration system 160. During operation, orchestration system 160 can instantiate the model to facilitate realization of mobile core SDN infrastructure 120 and can maintain the model in accordance to the parameters (e.g., KPIs, slice type definitions, etc.) defined for the model. In various embodiments, KPIs that can be included in a model can include, but not be limited to, a number of subscribers that can be handled per slice type and/or per slice instance for a given slice type, end-to-end delays of packet transfers through a slice instance, packet-loss parameters, signaling rates per slice instance, combinations thereof or the like. In at least one embodiment, KPIs can include those as described in European Telecommunications Standards Institute (ETSI) Network Function Virtualization (NFV) standards such as ETSI Group Standards (GS) NFV-MAN 001.

To understand slice management operations in a network environment, a brief discussion of DÉCOR principles is provided. The following discussion is offered earnestly for teaching purposes only and therefore should not be construed in any way to limit the broad teachings of the present disclosure. Slice management is based on DÉCOR operations described by 3GPP standards (e.g., 3GPP TS 23.401) that address operations for environments in which multiple core networks are present. One basis of DÉCOR is that when a mobile subscriber connects to a core network for the first time (e.g., with an initial-attach S1-MME control message) that core network can decide to redirect the control message to another core network. For this, the receiving MME, which will be referred to herein as a primary MME can interact with a SPR or HSS, etc. to obtain the subscriber record describing the subscription of the user and to find embedded in the subscriber record a data field called a 'UE-Usage-Type' indicating the type of slice to which this subscriber is to be classified. The type name (e.g., TUE-Usage-TypeT), which is a cardinal value, helps the primary MME to determine the appropriate core network that is to host (e.g., what MME to use) the subscriber's traffic.

Once a determination is made as where to host the initial-attach control message, the primary MME returns the initial-attach message to the RAN (e.g., an RF element) with instructions to connect the subscriber to a secondary or slice MME using a Non-Access Stratum (NAS) redirect message. For the NAS redirect message, the primary MME includes a 16-bit MMEGI data field in the message that refers to a group of MMEs associated with a particular slice. The MMEGI is used in the RAN by a RAN NNSF to initiate a load balancing procedure to dynamically select a secondary MME for a given slice to process the initial-attach message.

In 3GPP's DÉCOR solution, secondary MME selection is performed in the RAN by a RAN NNSF. This means that when an orchestration system for a 3GPP-based DÉCOR solution creates a new dynamic slice instance, it needs to announce this to other 3GPP subsystems such as the RAN. Similarly, when a dynamic slice is discarded, the orchestration system needs to retract the dynamic slice information from the RAN. When such events happen, the primary MME may be notified of changes in the configuration. However, involving the RAN for every creation and termination of a slice instance is cumbersome and can lead to increased signaling traffic between the orchestration system and the RAN for 3GPP-based DÉCOR solutions.

In contrast, the system and method provided by communication system 100, provides for the ability to perform core slice Type selection and load balancing operations via MMF 124. In various embodiments, communication system 100 can provide for the ability to manage dynamic slices, to perform slice Type selection, to load balance subscribers over available and dynamically created core slice Type slices and to enable network slicing for non-Décor systems.

During operation in at least embodiment, orchestration system 160 can manage dynamic slices, which can include slice Type instantiation, per-slice Type slice instantiation, slice termination, slice monitoring, combinations thereof or the like. Orchestration system 160 can maintain status information with respect to the status of slice Types/slices in terms of the KPIs established for the different slice types and slices of each Type defined for a given model. For instance, when new slice type or per-slice type slice instances are instantiated (e.g., as slices for a given slice type become overloaded, when it becomes preferable to instantiate a new slice type or slice instance at a new location, etc.), the orchestration system can announce the availability of the new slice type or slice(s) to the MMF 124 using one or more messages including identifying information for the new slice type or slice(s). Alternatively, when a slice type or particular slice for a slice type completely fails, the orchestration system 160 can retract slice instance(s) for the slice type or for a particular slice from the MMF 124 (e.g., to cause primary to remove reference(s) to the failed slice type or slice instance(s)).

Further, orchestration system 160 can provision dynamically instantiated slice instances into the 3GPP naming hierarchy such that MMF 124 can classify (e.g., via selection logic 126) a subscriber's flow to a given slice type and can load balance (e.g., via Core NNSF logic 128) the flow to a given slice instance for the slice Type to which the subscriber's flow has been classified.

Advantageously, communication system 100 can, in various embodiments, provide for the ability to support Rel-13 DÉCOR based systems as well as providing DÉCOR-like functionality for non-DÉCOR pre-Rel-13 systems without DÉCOR functions needing to be added to existing RAN infrastructures. During operation in a DÉCOR-based system, MMF 124 can proxy control channels (e.g., Stream Control Transmission Protocol (SCTP) tunnels) directly between RAN 110 and any MME server for a given core slice Type or slice instantiation via the S1-AP' interface.

In at least one embodiment, Core NNSF logic 128 can include instructions that, when executed (e.g., via one or more processor(s) configured for MMF 124) cause MMF 124 to perform load balancing operations based on KPIs monitored for each core slice Type/slice by orchestration system 160 such that orchestration system 160 can send MMF 124 status information (e.g., indications, values etc. associated with utilization, throughput, congestion, error rate, latency, combinations thereof or the like) for each core slice Type/slice instantiated for mobile core SDN infrastructure 120. For example, if a given slice instance of a given core slice Type is underutilized, MMF 124 via instructions provisioned for Core NNSF logic 128 can select the instance to handle more traffic and vice-versa if the given slice is over utilized, experiencing increased latency, etc. In one embodiment, load balancing operations can be performed by MMF 124 via Core NNSF logic 128 in a manner similar to operations that are typically performed by RAN-based NNSF functionality. Instructions provisioned for Core NNSF logic 128 can instruct MMF 124 to patch through the S1-AP connections between RAN 110 and the selected MME for the slice Type.

Accordingly, the solution provided by communication system 100 can provide for removing slice selection functionality from the RAN and enabling such functionality in a mobile core SDN infrastructure. Other operations, as discussed in further detail herein, can be used to enable non-DÉCOR 3GPP systems to benefit from slicing using MMF 124 within mobile core SDN infrastructure 120. In at least one embodiment for a non-DÉCOR 3GPP system, MMF 124 can presents itself to legacy RANs as a single (logical) MME and to the legacy cores as the RAN. The MMF 124 via selection logic 126 and Core NNSF logic 128 can provide DÉCOR functionality on behalf of legacy base stations (e.g., RF elements) to DÉCOR capable MME servers. In at least one embodiment, a key benefit of communication system 100 is the system's capability to support slicing without requiring changes to the RAN.

Figure 2A:
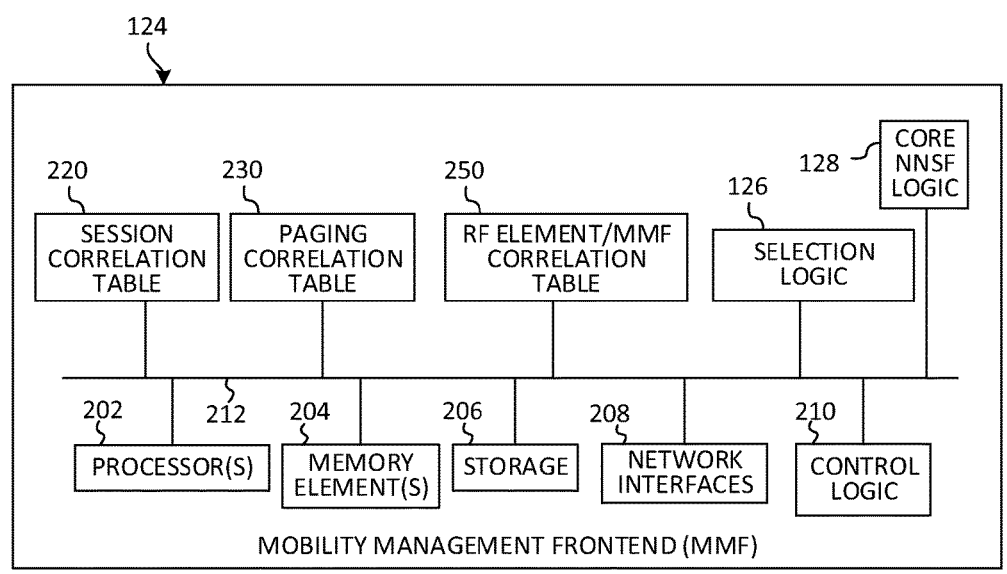
FIG. 2A is a simplified block diagram illustrating example details that can be associated with a Mobility Management Frontend (MMF) in accordance with one potential embodiment of the communication system.

Referring to FIG. 2A, FIG. 2A is a simplified block diagram illustrating example details that can be associated with MMF 124 in accordance with at least one embodiment. FIGS. 2B-2D are simplified schematic diagrams illustrating example details that can be associated with example data structures that can be maintained by MMF 124 in accordance with at least one embodiment. Example details discussed for MMF 124 can be associated with any MMF that may be implemented in communication system 100. In at least one embodiment, MMF 124 can include a one or more processor(s) 202, one or more memory element(s) 204, storage 206, network interfaces 208, control logic 210, selection logic 126, Core NNSF logic 128 and a bus 212. Various data structures can be maintained by MMF 124 including a session correlation table 220, a paging correlation table 230 and an RF element/MMF correlation table 250.

In at least one embodiment, processor(s) 202 is/are at least one hardware processor configured to execute various tasks, operations, and/or functions for MMF 124 as described herein according to software and/or instructions configured for the MMF. In at least one embodiment, memory element(s) 204 and/or storage 206 is/are configured to store data, information, software, instructions, logic (e.g., any logic 126, 128, and/or 210), data structures (e.g., any of tables 220, 230 and/or 250), combinations thereof, or the like for various embodiments described herein. Note that in some embodiments, storage can be consolidated with memory elements (or vice versa), or can overlap/exist in any other suitable manner.

In various embodiments, network interfaces 208 enable communication between MMF 124 and other network elements, systems, slices, etc. that may be present in communication system 100 to facilitate operations as discussed for various embodiments described herein. In some embodiments, network interfaces 208 can include one or more Ethernet driver(s) and/or controller(s), Fibre Channel driver(s) and/or controller(s), or other similar network interface driver(s) and/or controller(s) to enable communications for MMF 124 within communication system 100.

In at least one embodiment, control logic 210 can include instructions that, when executed (e.g., via one or more processor(s) 202), cause MMF 124 to perform operations, which can include, but not be limited to, providing overall control operations of MMF 124; providing paging operations for one or more UE; providing stateful proxy functions to proxy (e.g., forward) messaging between RF elements and core slice Type/slices; cooperating with other logic, data structures, etc. provisioned for, and/or maintained by MMF 124; combinations thereof; or the like to facilitate various operations as discussed for various embodiments described herein.

In at least one embodiment, bus 212 can be configured as an interface that enables one or more elements of MMF 124 (e.g., processor(s) 202, memory element(s) 204, logic, etc.) to communicate in order to exchange information and/or data. In at least one embodiment, bus 212 may be implemented as a fast kernel-hosted interconnect, potentially using shared memory between processes (e.g., logic, etc.), which can enable efficient communication paths between the processes.

In at least one embodiment, selection logic 126 can include instructions that, when executed (e.g., via one or more processor(s) 202), cause MMF 124 to perform operations, which can include, but not be limited to, querying HSS 132 to determine classification information including a UE-Usage-Type parameter for one or more UE, selecting a corresponding core slice Type to handle traffic for the UE based on the classification information, cooperating with other logic, data structures, etc. provisioned for, and/or maintained by MMF 124, combinations thereof, or the like to facilitate various operations as discussed for various embodiments described herein. As defined in 3GPP TS 23.008, a UE-Usage-Type parameter for a given UE is subscription information that indicates usage characteristics for the UE that enables the UE to be served by a particular DCN (e.g., a particular core slice Type).

In at least one embodiment, Core NNSF logic 128 can include instructions that, when executed (e.g., via one or more processor(s) 202), cause MMF 124 to perform operations, which can include, but not be limited to, gathering, receiving, etc. status information generated by orchestration system 160, load balancing subscriber traffic to a slice for a selected core Slice type based on the status information, cooperating with other logic, data structures, etc. provisioned for, and/or maintained by MMF 124, combinations thereof, or the like to facilitate various operations as discussed for various embodiments described herein.

As noted, MMF 124 can maintain various data structures including session correlation table 220, paging correlation table 230 and RF element/MMF correlation table 250. FIG. 2B is a simplified schematic diagram illustrating example details that can be associated with session correlation table 220 that can be maintained by MMF 124 in accordance with one potential embodiment. FIG. 2C is a simplified schematic diagram illustrating example details that can be associated with paging correlation table 230 that can be maintained by MMF 124 in accordance with one potential embodiment. FIG. 2D is a simplified schematic diagram illustrating example details that can be associated with RF element/MMF correlation table 250 that can be maintained by MMF 124 in accordance with one potential embodiment.

Referring to FIG. 2B, session correlation table 220 can include an RF element/UE session identity (ID) array 222, an MMF/UE session ID array 224, and an MME server/UE session ID array 226. RF element/UE session ID array 222 can include a number of entries 1–Y (where Y≥1) in which each entry indicates a session ID for each of a given UE as assigned to each of the UE by an RF element to which each UE is connected. For example, a RF element/UE session ID entry 222.1 indicates a session ID 'UE S1AP ID-1001' assigned to a first UE (e.g., UE 102.1) by the RF element (e.g., RF element 104.1) to which the UE is connected.

MMF/UE session ID array 224 can include a corresponding number of Y entries in which each entry indicates a session ID for each of a given UE as assigned to each UE by MMF 124 for each UE session. For example, a MMF/UE session ID entry 224.1 indicates a session ID 'UE S1AP ID-2001' assigned to the first UE by MMF 124 for the UE session.

MME server/UE session ID array 226 can include a corresponding number of Y entries in which each entry indicates a session ID for each of a given UE as assigned to each UE by an MME server for a given core slice Type/slice for handling traffic for the UE session. For example, a MME server/UE session ID entry 226.1 indicates a session ID 'UE S1AP ID-3001' assigned to the first UE by the MME server handling for the core slice Type/slice handling traffic for the UE session.

Each respective entry for each respective array 222, 224 and 226 can be associated, mapped or otherwise linked to each other to enable MMF 124 to operate as a stateful proxy for forwarding traffic forwarding between RF elements of the RAN 110 and core slices of mobile core SDN infrastructure 120 in a manner that is transparent to both the RAN RF elements and the core slices.

Referring to FIG. 2C, paging correlation table 230 can include an RF element global ID array 232 and a paging location list array 234. RF element global ID array 232 can include a number of entries 1–X (where X≥1) in which each entry indicates a given RF element global ID for each RF element of RAN 110. For example, a RF element global ID entry 232.1 can indicate a global ID (e.g., ECGI, CGI, etc.) associated with RF element 104.1. Paging location list array 234 can include a corresponding number of X entries in which each entry indicates a list of paging locations served by each corresponding RF element of RAN 110. For example, a paging list entry 234.1 can indicate each of one or more paging locations (LOC$_1$-LOC$_M$) served by RF element 104.1.

In various embodiments, paging locations can identify User Location Information (ULI) related location indicators or the like as defined by 3GPP or any other standards, vendors, etc. such as, for example, Tracking Area Identity (TAI), Routing Area Identity (RAI), Service Area Identity (SAI), Routing Area Code (RAC), Location Area Code (LAC), Location Area Identifier (LAI) Cell Global Identifier (CGI), E-UTRAN Cell Global Identifier (ECGI), Macro eNodeB ID, combinations thereof or the like. Each respective entry for each respective array 232 and 234 can be associated, mapped or otherwise linked to each other to enable MMF 124 to perform UE paging operations as discussed in further detail herein.

Referring to FIG. 2D, RF element/MMF correlation table 240 can include an RF element global ID array 242 and an MMF ID array 244. RF element global ID array 242 can include a number of entries 1–Z (where Z≥1) in which each entry indicates a list of RF element global ID(s) served by a given MMF and MMF ID array 244 can include a corresponding number of Z entries in which each entry indicates each corresponding MMF ID. For example, RF element list entry 242.1 can include a list including the global ID for RF element 104.1 and the global ID for RF element 104.2 and MMF ID entry 244.1 can include an ID for MMF 124. An MMF ID can be set to an MMEI and/or MMEGI.

Each respective entry for each respective array 242 and 244 can be associated, mapped or otherwise linked to each other to enable MMF 124 to perform handover operations between certain RF elements. In accordance with at least one embodiment, multiple MMFs can be implemented in communication system 100 to provide for a 'multi-MMF' architecture in which each MMF can serve a pool of RF elements and a corresponding pool of core slice Type/slices. Each MMF of a multi-MMF architecture can interface with each other via a GTP-C interface. In some embodiments, MMFs can further interface with each MME server of each core slice Type/slice served by another MMF via a GTP-C interface with each MME server.

For embodiments in which multiple MMFs are implemented in communication system 100, each MMF can be provisioned with an RF element MMF correlation table (e.g., RF element/MMF correlation table 240) that indicates the pools of RF elements served by each MMF that can be used to facilitate handover (HO) operations between RF elements served by different MMFs. Example handover operations are discussed in further detail herein.

In some embodiments, an MMF in a multi-MMF architecture can advertise new RF elements to which it may connect to other MMFs using a GTP-C interface interconnecting the MMFs. An inter-MMF advertisement (e.g., message) sent by a particular MMF can include the RF ID of an RF element or elements to which the particular MMF is connected and the MMF ID of the particular MMF. In some embodiments, MMFs in a multi-MMF architecture may send updates to a centralized database when they connect to new RF elements. In such embodiments, MMFs can query the database when a handover is needed for a particular UE served by a particular MMF in order to identify an MMF to which a target RF element may be connected.

Figure 3A:
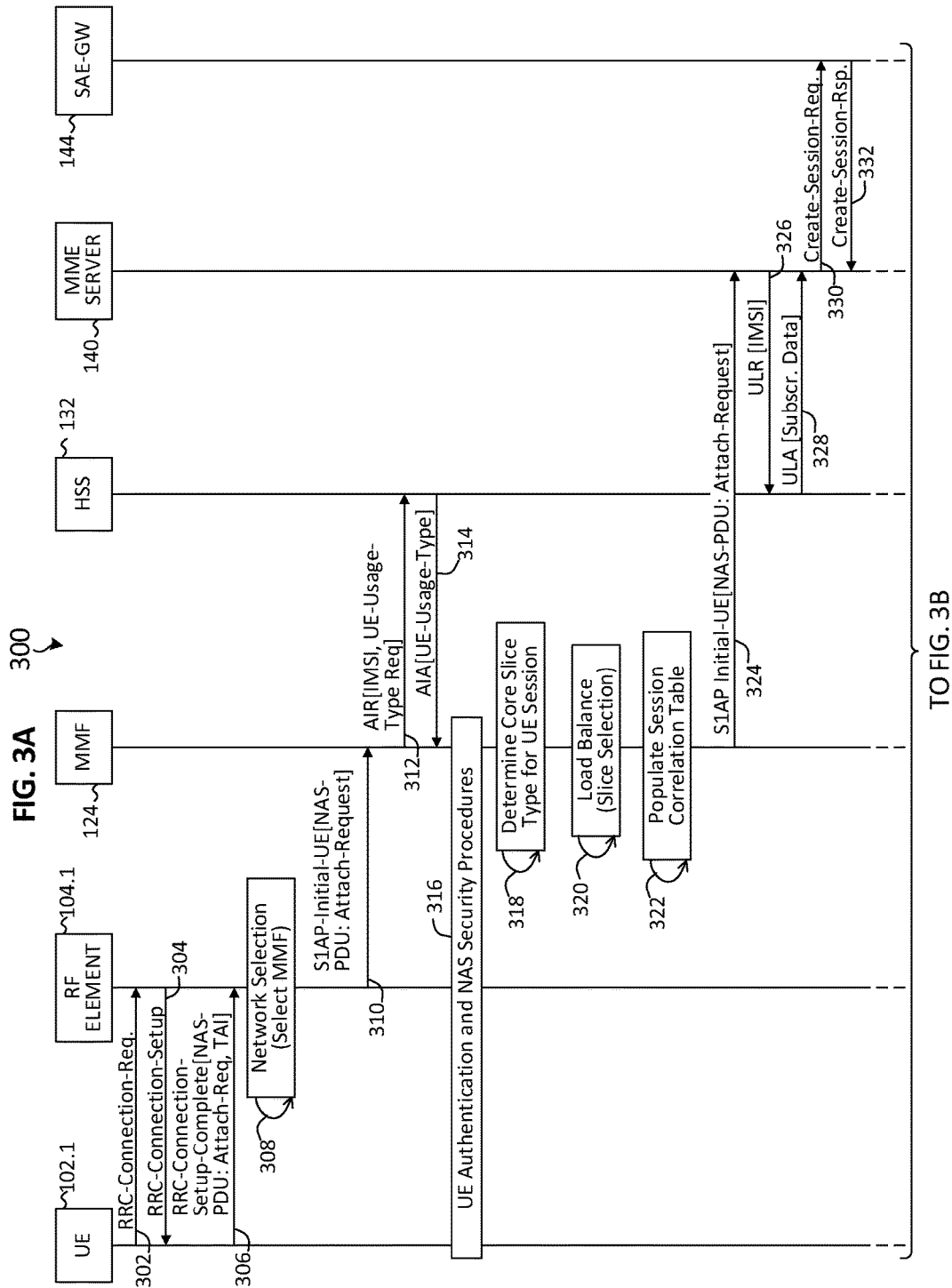
FIGS. 3A-3B are a simplified flow diagram illustrating example operations and interactions that can be performed to facilitate slice management in accordance with one potential embodiment.
Figure 3B:
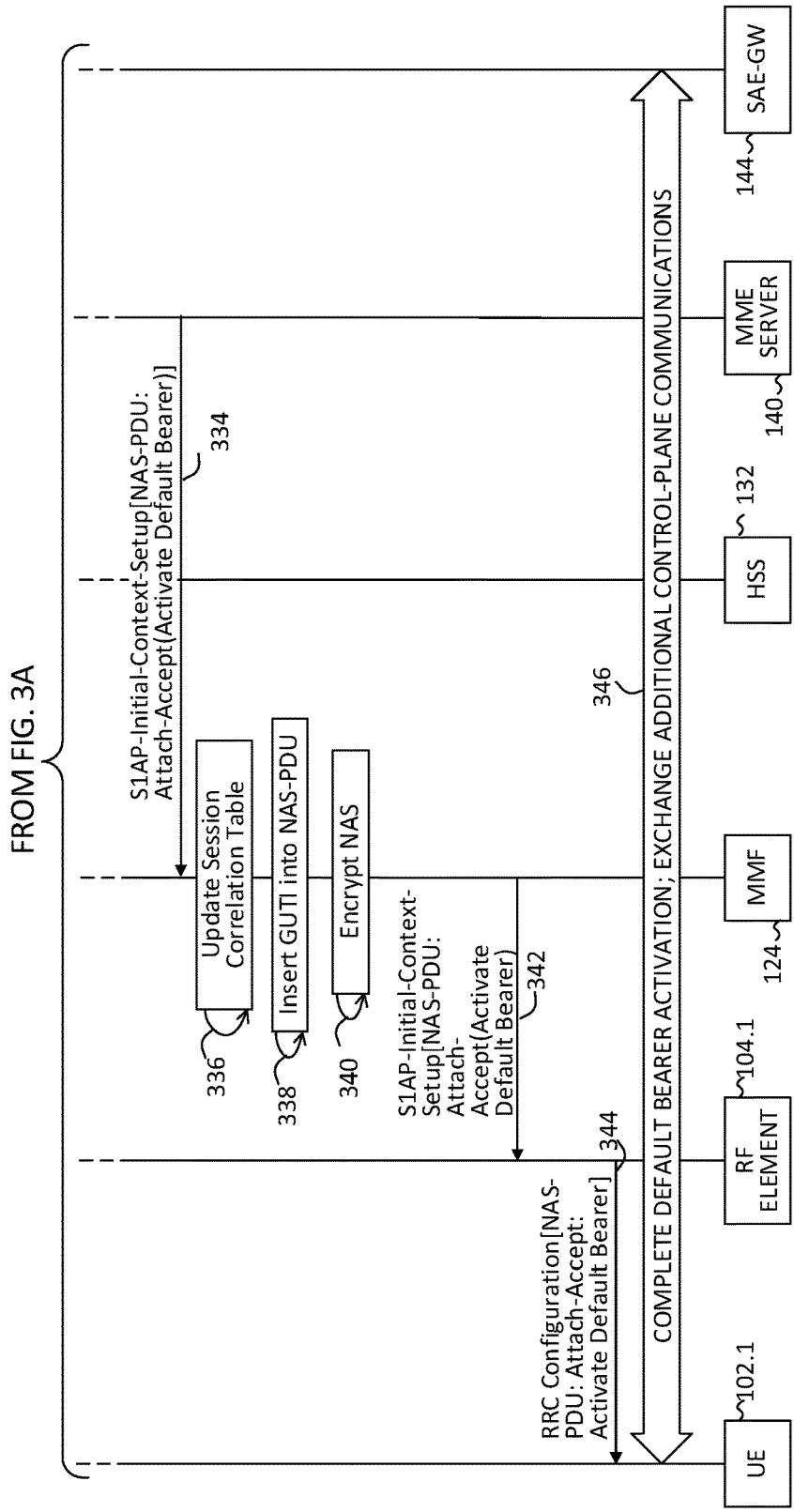

FIGS. 3A-3B are a simplified flow diagram 300 illustrating example operations and interactions that can be performed to facilitate slice management in accordance with one potential embodiment. FIGS. 4A-4D are simplified schematic diagrams illustrating example messages that can be exchanged to facilitate the slice management as discussed for FIGS. 3A-3B.

FIGS. 3A-3B include UE 102.1, RF element 104.1, MMF 124, HSS 132 and also MME server 140 and SAE-GW 144 associated with a first slice instance of core slice Type$_1$ 122.1. The example operations and interactions illustrated for flow diagram 300 for the embodiment of FIGS. 3A-3B are associated with UE 102.1 attaching to the mobile core SDN infrastructure 120. It should be understood, however, that the operations and interactions illustrated for the embodiment of FIGS. 3A-3B could be performed for any UE present in communication system 100. Further, MME server 140 and SAE-GW 144 are illustrated for the embodiment of FIGS. 3A-3B for illustrative purposes only and are not meant to limit the broad scope of the teachings of the present disclosure. It should be understood that any MME server, etc. could be selected based on classification (e.g., core slice Type selection) and load balancing operations performed by a given MMF for a given implementation of communication system 100.

Beginning at 302, UE 102.1 sends a Radio Resource Control (RRC) RRC-Connection-Request message to RF element 104.1. RF element 104.1 responds (304) with a RRC-Connection-Setup message to UE 102.1. At 306, UE 102.1 sends an RRC-Connection-Setup-Complete message to RF element 104.1 including a NAS-Protocol Data Unit (NAS-PDU) of a type Attach-Request including, among other information a last visited TAI for the UE. At 308, RF element 104.1 performs a network selection to select an MMF (e.g., MMF 124) to handle traffic for the UE 102.1 connection and assigns an RF element/UE session ID to the UE 102.1 session. The NAS-PDU is not operated on by the RF element. For the embodiment of FIGS. 3A-3B, it is assumed that RF element 104.1 assigns an RF element/UE session ID of S1AP ID-1001 to the UE 102.1 session. At 310, RF element 104.1 sends an S1AP-Initial-UE message to MMF 124 including the Attach-Request NAS PDU and the RF element/UE session ID.

Additional details related to the S1AP-Initial-UE message sent from RF element 104.1 to MMF 124 are illustrated in FIG. 4A for S1AP-Initial-UE message 410a. As illustrated for the embodiment of FIG. 4A, S1AP-Initial-UE message 410a can include, among other information, an Information Element (IE)/Group Name field 411 (e.g., MMEGI), a Message Type field 412 (e.g., set to an S1AP-Initial-UE message type), a session ID field 413 set to the RF element/UE session ID for the UE 102.1 session (e.g., S1AP ID-1001) and a NAS-PDU field 414 that can include, at least in part, the NAS-PDU type (e.g., Attach-Request) and other information as received from UE 102.1 at 306 (e.g., IMSI, network capabilities, attach type, etc.).

Returning to FIG. 3A, at 312, MMF 124 queries HSS 132 with an Authentication-Information-Request (AIR) message including the IMSI for the UE and a UE-Usage-Type request). At 314, HSS 132 responds to MMF 124 with an AI-Answer (AIA) indicating the UE-Usage-Type for UE 102.1. At 316, UE authentication and NAS security procedures can be performed between MMF 124 and UE 102.1. UE authentication and NAS security procedures can be performed according to 3GPP standards. In at least one embodiment, when a UE attaches to a network, a NAS security association can be performed between a UE and a given MMF, using a similar procedure as defined in 3GPP TS 23.401 for UE and MME NAS security associations, in order to facilitate the exchange of secure NAS messages between the UE and the MMF. Encryption and decryption processes can be used by the UE and the MMF based on the security association to process NAS requests and responses exchanged between the UE and the MMF.

Prior to the UE authentication and NAS security procedures, NAS messages (e.g., S1AP-Initial-UE messaging) received by MMF 124 for UE initial attachment will be unencrypted. However, subsequent NAS messages received from the UE will be encrypted, in which instances MMF 124 can decrypt the NAS messages before forwarding the messages to a given MME server serving the UE session.

Under an assumption of authentication and NAS security procedures being successfully performed for UE 102.1, MMF 124 determines at 318 a core slice Type to serve the UE session based on the UE-Usage-Type received from HSS 132 at 314. At 320, MMF 124 load balances the UE session to select a particular slice of the core slice Type to handle traffic for the UE session based on status information received from orchestration system 160. At 322, MMF 124 populates its session correlation table (e.g., session correlation table 220) with the RF element/UE session ID received from RF element 104.1 and with an MMF/UE session ID assigned by MMF 124 for the UE 102.1 session. For the embodiment of FIGS. 3A-3B, it is assumed that MMF 124 assigns a MMF/UE session ID of TS1AP ID-2001' for the UE 102.1 session and that a first slice (including MME server 140 and SAE-GW 133) of core slice Type₁ 122.1 is selected to handle traffic for the UE session.

At 324, MMF 124 proxies (e.g., forwards) the S1-AP-Initial-UE message to the MME server 140 and replaces the RF element/UE session ID with the MMF/UE session ID. Additional details related to the S1AP-Initial-UE message sent from MMF 124 to MME server 140 are illustrated in FIG. 4B for S1-AP-Initial-UE message 410b. As illustrated for the embodiment of FIG. 4B, S1AP-Initial-UE message 410b can include, among other information, the Information Element (IE)/Group Name field 411, the Message Type field 412 (e.g., set to the S1AP-Initial-UE message type), the session ID field 413 set to the MMF/UE session ID for the UE 102.1 session (e.g., S1AP ID-2001) and the NAS-PDU field 414 that can include, at least in part, the NAS-PDU type (e.g., Attach-Request) and other information as received from UE 102.1.

Returning to FIG. 3A, upon receiving the Attach-Request, MME server 140 queries HSS 132 at 326 with a User-Location-Request (ULR) message to determine subscription data for the subscriber associated with UE 102.1. At 328, HSS 132 responds with a UL-Answer (ULA) including subscription data for the subscriber associated with UE 102.1. At 330 and 332, respectively, a Create-Session-Request message and Create-Session-Response message are exchanged between MME server 140 and SAE-GW 144 to establish the session for UE 102.1 and MME server 140 assigns an MME/UE session ID to the UE 102.1 session. For the embodiment of FIGS. 3A-3B, it is assumed that MME server 140 assigns an MME/UE session ID of S1AP ID-3001 to the UE 102.1 session. In at least one embodiment, an MME server can maintain a session correlation table including UE ID information for each UE served thereby that is linked to a session ID assigned to each UE by the MME server. In at least one embodiment, a session correlation table can also include paging location information for each UE served thereby that can facilitate tracking area update (TAU) and paging procedures for the UE. In at least one embodiment, a separate paging correlation table can be maintained by an MME server including paging location information, UE session ID information, etc. to facilitate TAU and paging procedures for the UE.

Continuing to FIG. 3B, at 334, MME server 140 sends an S1AP-Initial-Context-Setup message to MMF 124 including, among other information, an Attach-Accept NAS-PDU including an Activate Default Bearer indication and the MME/UE session ID for the UE 102.1 session. Additional details related to the S1AP-Initial-Context-Setup message sent from MME server 140 to MMF 124 are illustrated in FIG. 4C for S1AP-Initial-Context-Setup message 434a. As illustrated for the embodiment of FIG. 4C, S1AP-Initial-Context-Setup message 434a can include, among other information, an Information Element (IE)/Group Name field 431, a Message Type field 432 (e.g., set to an S1AP-Initial-Context-Setup message type), a first session ID field 433.1 set to the MMF/UE session ID for the UE 102.1 session (e.g., S1AP ID-2001) which enables MMF 124 to associate the message with the UE 102.1 session, a second session ID field 433.2 set to the MME/UE session ID for the UE 102.1 session (e.g., S1AP ID-3001) and a NAS-PDU field 434 that can include, at least in part, the NAS-PDU type (e.g., Attach-Accept), the Activate Default Bearer indication and the IMSI for UE 102.1.

Returning to FIG. 3B, upon receiving the S1AP-Initial-Context-Setup message, MMF 124 updates (336) its session correlation table to include the MME/UE session ID for the UE 102.1 session, inserts (338) the GUTI assigned to UE 102.1 by MMF 124 into the NAS-PDU, and encrypts (340) the NAS-PDU to proxy (342) the S1AP-Initial-Context-Setup message toward RF element 104.1 with the session ID fields 433.1, 433.2 replaced, respectively, with the MMF/UE session ID (e.g., S1AP ID-2001) and the RF element/UE session ID (e.g., S1AP ID-1001), which enables RF element 104.1 to associate the message with the UE 102.1 session.

Additional details related to the S1AP-Initial-Context-Setup message sent from MMF 124 to RF element 104.1 are illustrated in FIG. 4D for S1AP-Initial-Context-Setup message 434b. As illustrated for the embodiment of FIG. 4D, S1AP-Initial-Context-Setup message 434b can include, among other information, the Information Element (IE)/Group Name field 431, the Message Type field 432 (e.g., set to an S1AP-Initial-Context-Setup message type), the first session ID field 433.1 set to the RF element/UE session ID for the UE 102.1 session (e.g., S1AP ID-1001) which enables RF element 104.1 to associate the message with the UE 102.1 session, the second session ID field 433.2 set to the MMF/UE session ID for the UE 102.1 session (e.g., S1AP ID-2001) and the NAS-PDU field 434 that can include, at least in part, the NAS-PDU type (e.g., Attach-Accept), the Activate Default Bearer indication and the IMSI for UE 102.1.

Returning to FIG. 3B, upon receiving the S1AP-Initial-Context-Setup message, RF element 104.1 sends an RRC-Configuration message to UE 102.1 at 344 including, among other information, the GUTI assigned to UE 102.1 by MMF 124 and the Attach-Accept NAS-PDU including the Activate Default Bearer indication. Operations and interactions (346) can then proceed between UE 102.1 and MME server 140 and SAE-GW 144 to complete the default bearer activation and/or exchange additional control-plane communications with MMF 124 proxying communications between the UE/RF element and the MME server 140 (e.g., for control-plane communications) and/or SAE-GW 144 (e.g., for user-plane communications) in a manner such that MMF 124 operations are transparent to the UE/RF element and core slice Type/slice elements, which enables various interactions and operations between the UE/RF element and core slice Type/slice elements to be performed according to 3GPP standards.

Accordingly, communication system 100 provides a system and method to dynamically manage a series of 5G (dynamic) network core slices and also provides for the ability to enable non-DÉCOR 3GPP functionality to benefit from slicing using MMF 124 combined with mobile core SDN infrastructure 120. The MMF 124 presents itself to legacy RANs as a single (logical) MME, to the legacy core slice Type(s) as the RAN and towards each MME server as the RAN. Further, the MMF 124 combined with the core-hosted NNSF logic 128 provides DÉCOR functionality on behalf of legacy base stations to DÉCOR capable MME server(s).

In at least one embodiment, one primary benefit of communication system 100 is that it provides for the ability to support slicing without requiring changes to a RAN. For example, pre-Rel-13 RAN and core solutions can benefit from DÉCOR functions without a requirement for inclusion of DÉCOR functions in the RAN. Further, current DÉCOR functions rely heavily on RAN-based load balancing of slice instances. Communication system 100, by providing core NNSF functionality inside the mobile core SDN infrastructure, provides for the ability to realize alternate, non-RAN-based techniques for load balancing that can be used to indicate to the core NNSF logic 128 the availability of (dynamically) created slice instance(s) of certain core slice Type(s), which provides a secondary benefit of communication system 100 in accordance with at least one embodiment.

Even further, by keeping mobile core related functions within the mobile core SDN infrastructure, the orchestration of core slice Type(s)/slice(s), combined with HSS provisioning can be coordinated from a single point to provide yet another benefit in accordance with at least one embodiment of communication system 100. Even further, the integration of mobile packet core functions together within the mobile core SDN infrastructure enables an orchestrator to use DÉCOR functionality for high-availability failover procedures in accordance with at least one embodiment of communication system 100. Finally, by integration of core NNSF logic 128 into the mobile core SDN infrastructure, the mobile core's role is not diluted when deploying DÉCOR architectures.

Referring to FIG. 5, FIG. 5 is a simplified flow diagram 500 illustrating other example operations and interactions that can be performed to facilitate paging in accordance with one particular embodiment. In particular, the embodiment of FIG. 5 illustrates example operations and interactions that can be associated with paging a UE in order for the UE receive downlink (DL) data.

FIG. 5 includes UE 102.1, RF element 104.1, MMF 124, HSS 132 and also MME server 140 and SAE-GW 144 associated with a first slice instance of core slice Type$_1$ 122.1. The example operations and interactions illustrated for flow diagram 500 for the embodiment of FIG. 5 can be associated with paging UE 102.1 to receive downlink data. It should be understood, however, that the operations and interactions illustrated for the embodiment of FIG. 5 could be performed for any UE present in communication system 100. Further, MME server 140 and SAE-GW 144 are illustrated for the embodiment of FIG. 5 for illustrative purposes only and are not meant to limit the broad scope of the teachings of the present disclosure. It should be understood that any MME server, etc. could be selected based on classification (e.g., core slice type selection) and load balancing operations performed by a given MMF for a given implementation of communication system 100.

In at least one embodiment, the operations and interactions illustrated in FIG. 5 assume that UE 102.1 is in an RRC-IDLE mode and therefore is unable to receive downlink data until the UE is transitioned back into an RRC-CONNECTED mode. While the UE is in the RRC-IDLE mode, its RRC connection is released and it cannot receive data from the network, yet the UE monitors a paging channel and, upon receiving a paging message, an RRC connection can be reestablished for the UE to receive data from the network.

Beginning at 502 it is assumed for the embodiment of FIG. 5 that a downlink (DL) packet is sent to SAE-GW 144 from PDN 170. At 504, SAE-GW 144 sends a DL Data Notification (DDN) to MME server 504. In response to the DDN, MME server 140 sends a paging message to MMF 124 at 506 that includes the S-TMSI for UE 102.1 and the TAI list for the UE. MME servers can maintain their own corresponding paging correlation and/or session correlation tables including paging location information (e.g., TAI lists) for each UE served thereby for location update (e.g., Tracking Area Update) and paging purposes. Multiple UEs can have a same TAI list associated therewith.

At 508, MMF 124 performs a lookup on its paging correlation table 230 using the TAI list to recover RF element ID(s) that associated with the list of TAIs. Based on the lookup, MMF can determine to send the paging message to RF element 104.1 at 510 including the S-TMSI for UE 102.1 and RF element 104.1 can perform a paging procedure (512) to transition the UE to an RRC CONNECTED mode in order to deliver (not shown) the DL data to the UE.

Figure 6:
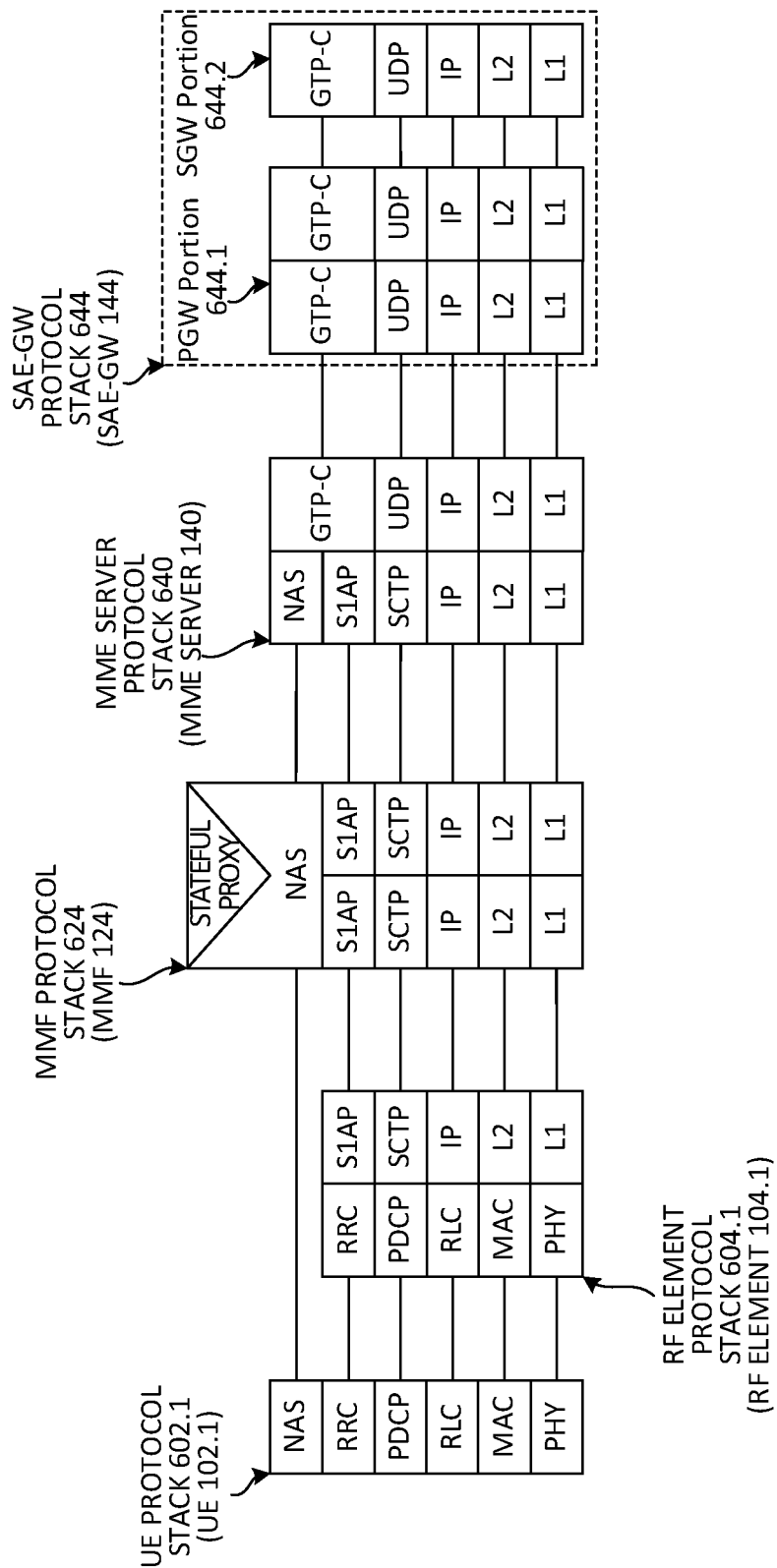
FIG. 6 is a simplified schematic diagram illustrating example protocol stack details that can be associated with one potential embodiment.

Referring to FIG. 6, FIG. 6 is a simplified schematic diagram illustrating example protocol stack details that can be associated with one potential. FIG. 6 illustrates a layered protocol diagram 600 that can facilitate communications between various elements of communication system 100.

FIG. 6 illustrates UE protocol stack 602.1 for UE 102.1, a RF element protocol stack 604.1 for RF element 104.1, an MMF protocol stack 624 for MMF 124, an MME server protocol stack 640 for MME server 140 and an SAE-GW protocol stack 644 for SAE-GW 144. SAE-GW protocol stack 644 can include a PGW portion 644.1 and an SGW portion 644.2.

Each protocol stack can include a number of protocol layers or, more generally, layers that can facilitate the exchange of communications in communication system 100. A 'protocol layer' or a 'layer', as referred to herein, can be any layer in a multi-layered scheme that facilitates communications between layers, such as, for example, the Open Systems Interconnection (OSI) Model, using one or more communication protocols. A set of one or more interconnected layer(s) can be referred to herein as a 'protocol stack'. In some embodiments, a protocol stack may include only one layer.

UE protocol stack 602.1 can include a NAS layer to facilitate NAS functionality, an RRC layer to facilitate RRC functionality, a Packet Data Convergence Protocol (PDCP) layer to facilitate PDCP functionality, a Radio Link Control (RLC) layer to facilitate link control functionality, a Medium Access Control (MAC) layer to facilitate MAC functionality and a physical (PHY) layer.

RF element protocol stack 604.1 can include an RRC layer, a PDCP layer, an RLC layer, a MAC layer, a PHY layer, an S1AP layer to facilitate S1AP functionality, an SCTP layer to facilitate SCTP functionality, an IP layer to facilitate IP functionality, a Layer 2 (L2) layer to facilitate L2 functionality and a Layer 1(L1) layer to facilitate L1 functionality.

MMF protocol stack 624 can include a NAS layer, an S1AP layer, an SCTP layer, an IP layer, an L2 layer and an L1 layer. As illustrated in FIG. 6, MMF protocol stack 624 can be provisioned with stateful proxy functionality to facilitate proxying communications between various nodes, UE, elements, etc. of the RAN and various nodes, servers, elements, gateways, functions, etc. of the mobile core infrastructure as discussed for various embodiments described herein.

MME server protocol stack 640 can include a NAS layer, an S1AP layer, an SCTP layer, an IP layer, an L2 layer, an L1 layer, a GTP-C layer and a User Datagram Protocol (UDP) layer. PGW portion 644.1 of SAE-GW protocol stack 644 includes a GTP-C layer, a UDP layer, an IP layer, a L2 layer and a L1 layer. SGW portion 644.2 of SAE-GW protocol stack 644 also includes a GTP-C layer, a UDP layer, an IP layer, a L2 layer and a L1 layer.

Figure 7:
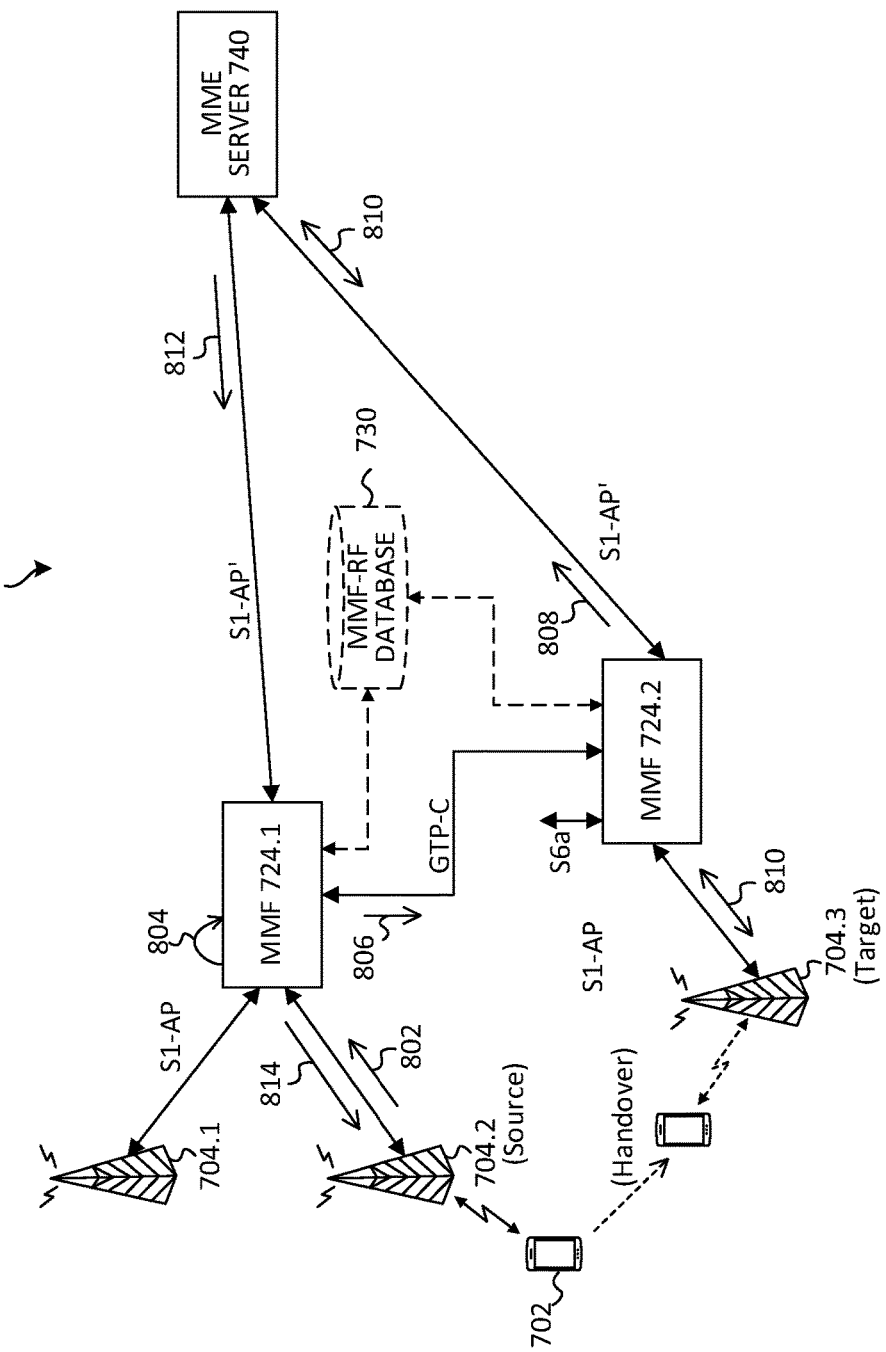
FIG. 7 is a simplified block diagram illustrating example operations and interactions that can be performed to facilitate a handover in accordance with one potential embodiment.

Referring to FIG. 7, FIG. 7 is a simplified block diagram 700 illustrating various example operations interactions that that can be performed to facilitate a handover between RF elements in accordance with one potential embodiment. FIG. 7 includes a UE 702, a first RF element 704.1, a second RF element 704.2, a third RF element 704.3, a first MMF 724.1, a second MMF 724.2 and an MME server 740. The first and second RF elements 704.1, 704.2 can be served by first MMF 724.1 and the third RF element 704.3 can be served by second MMF 724.2. First MMF 724.1 can interface with MME server 740 via an S1-APT interface and second MMF 724.2 can interface with MME server 740 via an S1-APT interface. The first and second MMFs 724.1, 724.2 can interface via a GTP-C interface. In at least one embodiment, an MMF-RF database 730 can be provisioned to support inter-MMF identification of RF element(s) served by each MMF in a multi-MMF architecture. Although not shown for the embodiment of FIG. 7, it should be understood that the MMFs, MME server and the MMF-RF database, if deployed, can be provisioned for a mobile core SDN infrastructure as discussed for various embodiments described herein.

For the embodiment of FIG. 7, it can be assumed that UE 702 is connected to second RF element 704.2, referred to for the present embodiment as the Source RF element, and transitions to the coverage area of third RF element 704.3, referred to for the present embodiment as the Target RF element. Further for the embodiment of FIG. 7, it is assumed that each MMF 724.1, 724.2 has populated its own RF element/MMF correlation table that includes lists of RF elements served by each MMF.

As discussed herein, in some embodiments, an MMF in a multi-MMF architecture can advertise new RF elements to which it may connect to other MMFs using a GTP-C interface interconnecting the MMFs. An inter-MMF advertisement (e.g., message) sent by a particular MMF can include the RF ID of an RF element or elements to which the particular MMF is connected and the MMF ID of the particular MMF. In some embodiments, MMFs in a multi-MMF architecture may send updates to a centralized database (e.g., MMF-RF database 730) when they connect to new RF elements. In such embodiments, MMFs can query the database when a handover is needed for a particular UE served by a particular MMF in order to identify an MMF to which a target RF element may be connected.

Based on the UE 702 transition and measurement reports, etc. received from UE 702, Source RF element 704.2 sends (802) an S1AP-Handover-Required message to first MMF 724.1 including, among other information, an IMSI for UE 702, an RF element ID for Target RF element 704.3 and the last visited TAI for UE 702. First MMF 724.1 performs a lookup (804) on its RF element/MMF correlation table using the RF element ID received Target RF element 704.3 to determine that second MMF 724.2 is serving the Target RF element 704.3. For the embodiment of FIG. 7, it can be assumed that no MME server relocation is needed to support the handover. Embodiments in which an MME server relocation is needed to support a handover is discussed in further detail, below, with regard to FIG. 8.

Returning to FIG. 7, based on the determination, first MMF 724.1 forwards (806) the S1AP-Handover-Required message to second MMF 724.2, which forwards (808) the S1AP-Handover-Required message to MME server 740. An S1AP-Handover-Request and Acknowledgment procedure (810) is carried out between second MMF 724.2, MME server 740 and Target RF element 704.3. Following completion of the Request and Acknowledgment procedure, MME server 740 sends (812) an S1AP-Handover-Command message to the first MMF 724.1, which forwards (814) the Command to Source RF element 704.2 and handover operations can be completed according to 3GPP standards to complete handover of UE 702 to Target RF element 704.3. Accordingly, the system and method provided by communication system 100 can facilitate handover operations for deployments in which multiple MMFs are implemented serving different RF element pools.

Figure 8:
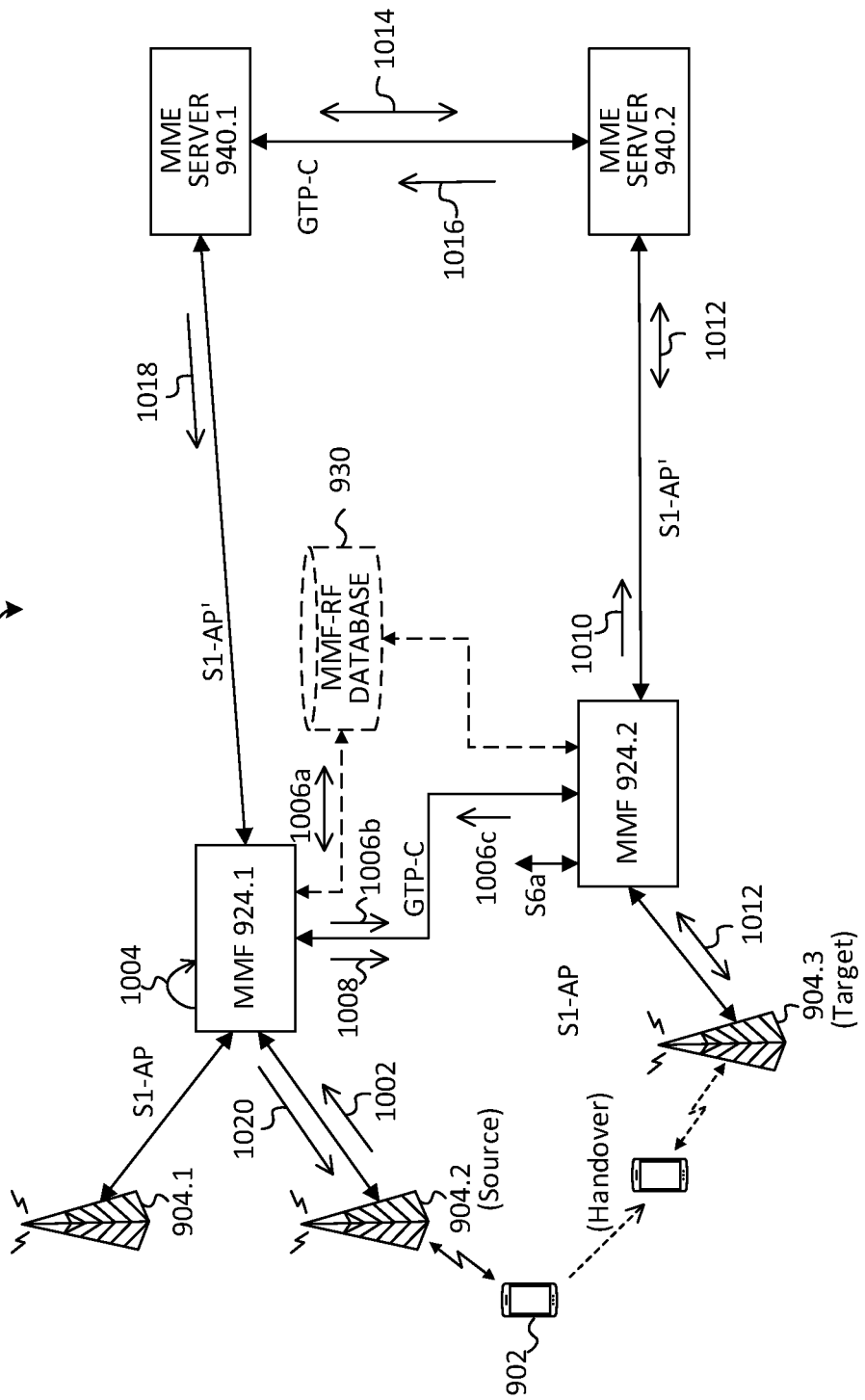
FIG. 8 is a simplified block diagram illustrating other example operations and interactions that can be performed to facilitate another handover in accordance with one potential embodiment.

Referring to FIG. 8, FIG. 8 is a simplified block diagram 900 illustrating other various example operations interactions that that can be performed to facilitate another handover between RF elements in accordance with one potential embodiment. FIG. 8 includes a UE 902, a first RF element 904.1, a second RF element 904.2, a third RF element 904.3, a first MMF 924.1, a second MMF 924.2, a first MME server 940.1 and a second MME server 940.2. The first and second RF elements 904.1, 904.2 can be served by first MMF 924.1 and the third RF element 904.3 can be served by second MMF 924.2. First MMF 924.1 can interface with first MME server 940.1 via an S1-APT interface and second MMF 924.2 can interface with second MME server 940.2 via an S1-APT interface. The first and second MMFs 924.1, 924.2 can interface via a GTP-C interface. The first and second MME servers 940.1, 940.2 can also interface via a GTP-C interface. In at least one embodiment, an MMF-RF database 930 can be provisioned to support inter-MMF identification of RF element(s) served by each MMF in a multi-MMF architecture. Although not shown for the embodiment of FIG. 8, it should be understood that the MMFs, the MME servers and the MMF-RF database, if deployed, can be provisioned for a mobile core SDN infrastructure as discussed for various embodiments described herein.

For the embodiment of FIG. 8, it can be assumed that UE 902 is connected to second RF element 904.2, referred to for the present embodiment as the Source RF element, and transitions to the coverage area of third RF element 904.3, referred to for the present embodiment as the Target RF element.

As discussed herein, in some embodiments, an MMF in a multi-MMF architecture can advertise new RF elements to which it may connect to other MMFs using a GTP-C interface interconnecting the MMFs. An inter-MMF advertisement (e.g., message) sent by a particular MMF can include the RF ID of an RF element or elements to which the particular MMF is connected and the MMF ID of the particular MMF. In some embodiments, MMFs in a multi-MMF architecture may send updates to a centralized database (e.g., MMF-RF database 930) when they connect to new RF elements. In such embodiments, MMFs can query the database when a handover is needed for a particular UE served by a particular MMF in order to identify an MMF to which a target RF element may be connected.

Based on the UE 902 transition and measurement reports, etc. received from UE 902, Source RF element 904.2 sends (1002) an S1AP-Handover-Required message to first MMF 924.1 including, among other information, an IMSI for UE 902, an RF element ID for Target RF element 904.3 and the last visited TAI for UE 902. At 1004, MMF 924.1 can determine whether it has the RF element ID for Target RF element 904.3 stored in its RF element/MMF correlation table.

In an embodiment in which MMF-RF database 930 is configured for the communication system, if first MMF 924.1 determines that it does not have the RF element ID for Target RF element 904.3 stored in its correlation table, the first MMF 924.1 can query (1006a) MMF-RF database 930 to retrieve the MMF ID for second MMF 924.2 to which Target RF element 904.3 is connected. In an embodiment in which no MMF-RF database is configured for the communication system, if first MMF 924.1 determines that it does not have the RF element ID for Target RF element 904.3 stored in its table, it can query (1006b) other MMFs (e.g., second MMF 924.2) to try and determine which MMF is connected to the Target RF element 904.3. For example, second MMF 924.2 can respond (1006c) to the query with its MMF ID and the RF element ID for Target RF element 904.3 to indicate that it is serving the Target RF element.

Based on a determination at 1004 that MMF 924.1 has an association stored for Target RF element 904.3 or determines the association following one or more queries, MMF 924.1 forwards (1008) the S1AP-Handover-Required message to second MMF 924.2, which forwards (1010) the S1AP-Handover-Required message to second MME server 940.2. An S1AP-Handover-Request and Acknowledgment procedure (1012) is carried out between second MMF 924.2, second MME server 940.2 and Target RF element 904.3. Following completion of the Request and Acknowledgment procedure, a context request and response exchange (1014) is performed between second MME server 940.2 and first MME server 940.1 for the second MME server 940.2 to retrieve the context (e.g., session information) for UE 902. At 1016, second MME server sends an S1AP-Handover-Command message to the first MME server 940.1, which forwards (1018) the message to first MMF 924.1 and first MMF 924.1 forwards (1020) the Command to Source RF element 904.2 and handover operations can be completed according to 3GPP standards to complete handover of UE 902 to Target RF element 904.3.

Figure 9:
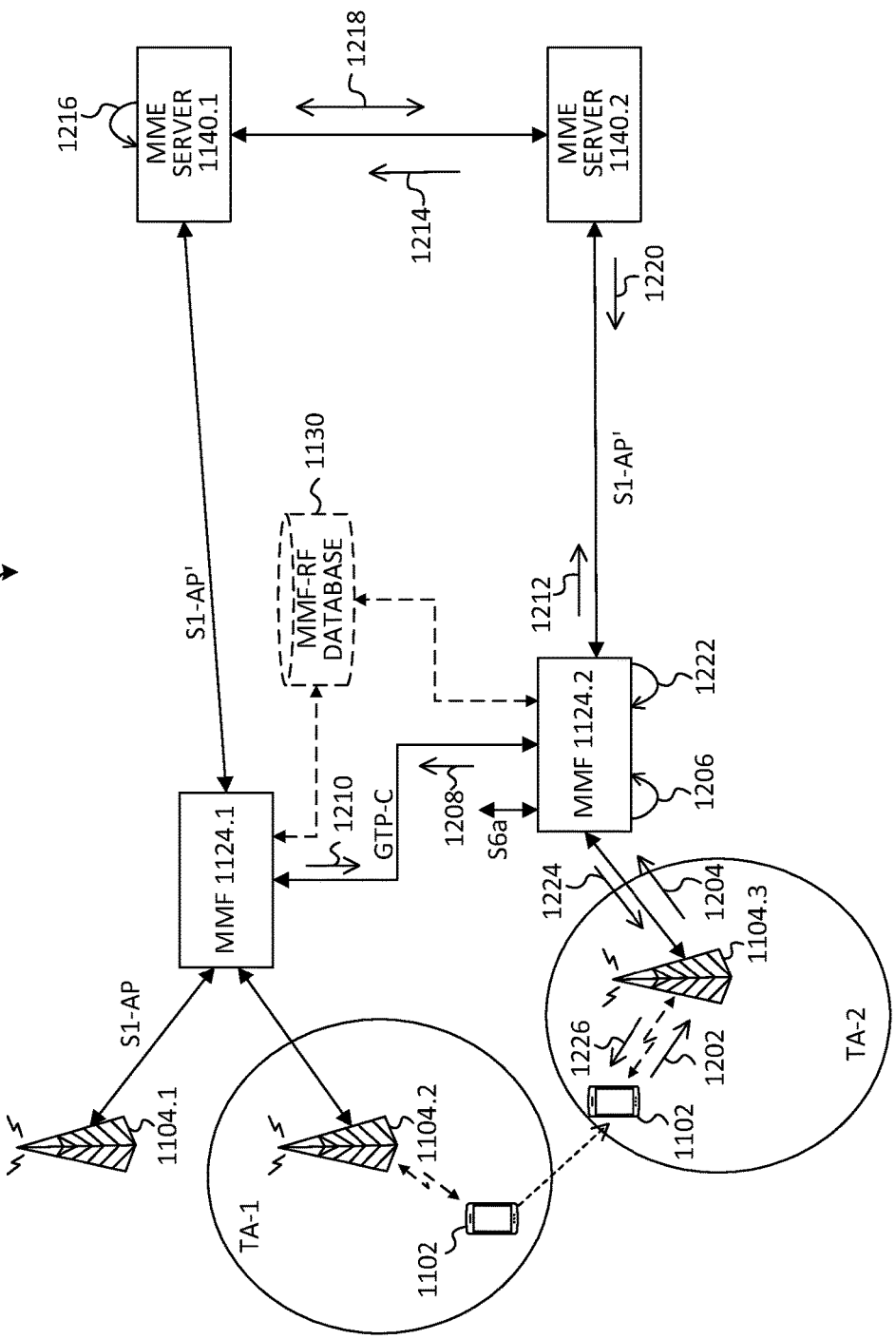
FIG. 9 is a simplified block diagram illustrating example operations and interactions that can be performed to facilitate a tracking area update in accordance with one potential embodiment.

Referring to FIG. 9, FIG. 9 is a simplified block diagram 1100 illustrating various example operations interactions that that can be performed to facilitate a tracking area update (TAU) procedure in accordance with one potential embodiment. In particular, the TAU procedure illustrated in the embodiment of FIG. 9 can be associated with a TAU in which an MME server is relocated for a UE based on the TAU. FIG. 9 includes a UE 1102, a first RF element 1104.1, a second RF element 1104.2, a third RF element 1104.3, a first MMF 1124.1, a second MMF 1124.2, a first MME server 1140.1 and a second MME server 1140.2. The first and second RF elements 1104.1, 1104.2 can be served by first MMF 1124.1 and the third RF element 1104.3 can be served by second MMF 1124.2. First MMF 1124.1 can interface with first MME server 1140.1 via an S1-APT interface and second MMF 1124.2 can interface with second MME server 1140.2 via an S1-APT interface. The first and second MMFs 1124.1, 1124.2 can interface via a GTP-C interface. The first and second MME servers 1140.1, 1140.2 can also interface via a GTP-C interface. In at least one embodiment, an MMF-RF database 1130 can be provisioned to support inter-MMF identification of RF element(s) served by each MMF in a multi-MMF architecture. Although not shown for the embodiment of FIG. 9, it should be understood that the MMFs, the MME servers and the MMF-RF database, if deployed, can be provisioned for a mobile core SDN infrastructure as discussed for various embodiments described herein.

For the embodiment of FIG. 9, it can be assumed that second RF element 1104.2 service a first Tracking Area (TA-1) and that third RF element 1104.3 serves a second Tracking Area (TA-2) that is not identified in a Tracking Area Identity (TAI) list currently stored at UE 1102. Further for the embodiment of FIG. 9, it can be assumed that UE 1102 is in an RRC-IDLE state as it transitions from a coverage area of the second RF element 1104.2 (e.g., TA-1) to a coverage area of the third RF element 1104.3 (e.g., TA-2), that UE 1102 was previously served by first RF element 1104.1, and that TA-2 is not identified in the TAI list currently stored at the UE.

As discussed herein, in some embodiments, an MMF in a multi-MMF architecture can advertise new RF elements to which it may connect to other MMFs using a GTP-C interface interconnecting the MMFs. An inter-MMF advertisement (e.g., message) sent by a particular MMF can include the RF ID of an RF element or elements to which the particular MMF is connected and the MMF ID of the particular MMF. In some embodiments, MMFs in a multi-MMF architecture may send updates to a centralized database (e.g., MMF-RF database 930) when they connect to new RF elements. In such embodiments, MMFs can query the database when a handover is needed for a particular UE served by a particular MMF in order to identify an MMF to which a target RF element may be connected.

At 1202, UE 1102 detects that it has entered a tracking area (TA-2) that is not identified in its TAI list and sends a Tracking Area Update (TAU) Request message to third RF element 1104.3. At 1204, third RF element 1104.3 inserts the GUTI for UE 1102 into the TAU Request and the forwards the TAU Request to second MMF 1124.2. At 1206, second MMF 1124.2 determines the identity of the (old) MMF (e.g., first MMF 1124.1) that previously served the UE using the GUMMEI derived from the GUTI for UE 1102.

At 1208, second MMF 1124.2 sends a request to first MMF 1124.1 requesting the identity of the MME server that previously served the UE and, at 1210, the first MMF 1124.1 responds with the identity of MME server 1140.1. At 1212, the second MMF 1124.2 sends the TAU request to second MME server 1140.2 in which the TAU request includes the identity of MME server 1140.1. At 1214, second MME server 1140.2 sends a context request message to first MME server 1140.2 to which first MME server 1140.1 responds to second MME server 1140.2 with a context response message at 1218 with the context for UE 1102. Among other information, the UE context can include GTP and/or S5 connection information (e.g., IP addresses, tunnel endpoint identifiers, etc.) associated with data-plane connectivity for the UE. At 1216, first MME server 1140.1 updates its paging and/or session correlation table(s) to remove any entries associated with UE 1102 and can release the session connection for the UE with first MMF server 1124.1.

At 1220, the second MME server 1140.2 sends a TAU Accept message including a new TAI list for the UE that includes TA-2. At 1222, second MMF 1124.2 assigns a new GUTI to UE 1102 and stores a correlation of the GUTI with the UE. At 1224, second MME server 1140.2 sends the TAU Accept message to third RF element 1104.3, which forwards (1226) the TAU Accept message to the UE 1102.

Although the embodiment of FIG. 9 illustrates example details associated with a TAU procedure in which an MME server relocation is performed, there may be cases in which MME server relocation is not needed. For embodiments in which no MME server relocation is needed, a (new) MMF receiving a TAU Request from a given UE can send the TAU Request to the MME server serving the UE. The TAU Request and subsequent Accept can be exchanged between the new MMF and the MME server via an S1-APT interface interconnecting the new MMF and the MME server. Other operations and/or interactions can be performed similar to those illustrated for the embodiment of FIG. 9.

Figure 10:
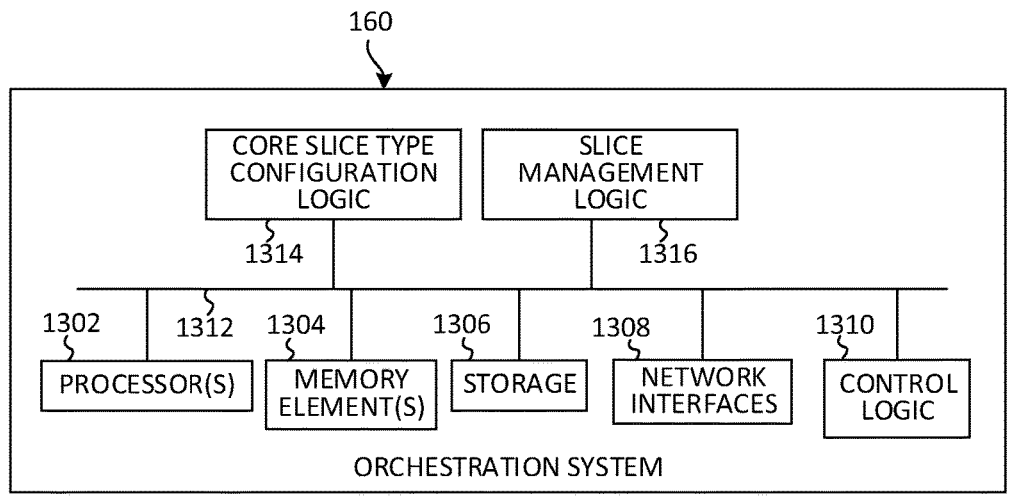

Referring to FIG. 10, FIG. 10 is a simplified block diagram illustrating example details that can be associated with orchestration system 160 in accordance with one potential embodiment of communication system 100. In at least one embodiment, orchestration system can include can include a one or more processor(s) 1302, one or more memory element(s) 1304, storage 1306, network interfaces 1308, control logic 1310, a bus 1312, core slice Type configuration logic 1314, and slice management logic 1316.

In at least one embodiment, processor(s) 1302 is/are at least one hardware processor configured to execute various tasks, operations, and/or functions for orchestration system 160 as described herein according to software and/or instructions configured for the orchestration system. In at least one embodiment, memory element(s) 1304 and/or storage 1306 is/are configured to store data, information, software, instructions, logic (e.g., any logic 1314 and/or 1316), data structures, combinations thereof, or the like for various embodiments described herein. Note that in some embodiments, storage can be consolidated with memory elements (or vice versa), or can overlap/exist in any other suitable manner.

In various embodiments, network interfaces 1308 enable communication between orchestration system 160 and other network elements (e.g., an MMF), systems, slices, etc. that may be present in communication system 100 to facilitate operations as discussed for various embodiments described herein. In some embodiments, network interfaces 1308 can include one or more Ethernet driver(s) and/or controller(s), Fibre Channel driver(s) and/or controller(s), or other similar network interface driver(s) and/or controller(s) to enable communications for orchestration system 160 within communication system 100

In at least one embodiment, control logic 1310 can include instructions that, when executed (e.g., via one or more processor(s) 1302), cause orchestration system 160 to perform operations, which can include, but not be limited to, providing overall control operations of orchestration system 160; cooperating with other logic, data structures, etc. provisioned for and/or maintained by orchestration system 160; combinations thereof; or the like to facilitate various operations as discussed for various embodiments described herein.

In at least one embodiment, bus 1312 can be configured as an interface that enables one or more elements of orchestration system 160 (e.g., processor(s) 1302, memory element(s) 1304, logic, etc.) to communicate in order to exchange information and/or data. In at least one embodiment, bus 1312 may be implemented as a fast kernel-hosted interconnect, potentially using shared memory between processes (e.g., logic, etc.), which can enable efficient communication paths between the processes.

In at least one embodiment, core slice type configuration logic 1314 can include instructions that, when executed (e.g., via one or more processor(s) 1302), cause orchestration system 160 to perform various operations including, but not limited to: configuring and/or instantiating one or more core slice Type(s)/slice(s) according to a model that defines different core slice Types to be operated within mobile core SDN infrastructure 120; configuring interconnections between core slice Type(s)/slice(s) and other elements of mobile core SDN infrastructure, RAN 110 and PDN(s) 170; combinations thereof; or the like to facilitate various operations as discussed for various embodiments described herein.

In at least one embodiment, slice management logic 1316 can include instructions that, when executed (e.g., via one or more processor(s) 1302) cause orchestration system 160 to perform various operations including, but not limited to: maintaining (e.g., adding or removing) one or more core slice Type(s)/sliice(s) according to a model in accordance with parameters (e.g., KPIs, slice type definitions, etc.) defined for the model; determining status information for one or more core slice Type(s)/slice(s); interacting with one or more MMF(s) to communicate status information to or retrieve status information from the MMF(s); combinations thereof; or the like to facilitate various operations as discussed for various embodiments described herein.

Figure 11:
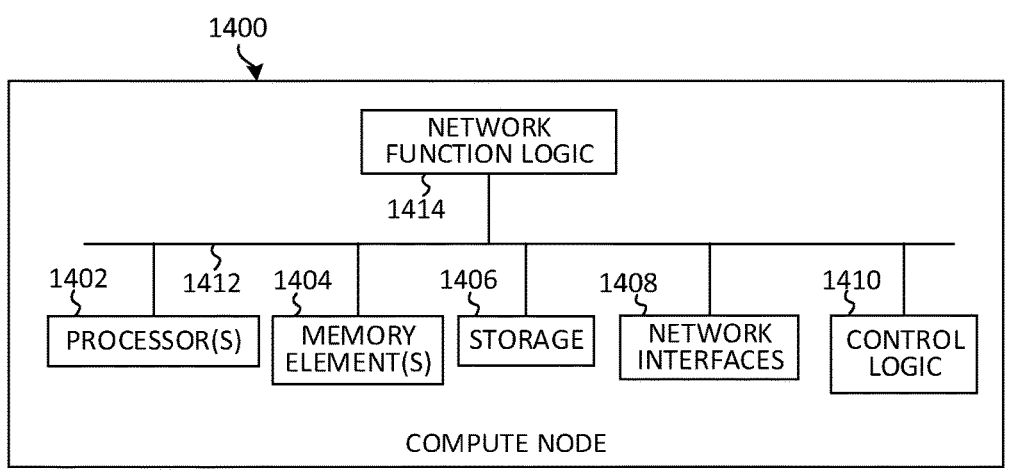

Referring to FIG. 11, FIG. 11 is a simplified block diagram illustrating example details that can be associated with a compute node 1400 in accordance with one potential embodiment of communication system 100. In various embodiments, network element functionality for each of one or more core slice Type(s)/slice(s) can be performed using any combination of compute nodes. In various embodiments, compute node 1400 can be implemented as: a data center compute node such as a server, rack of servers, multiple racks of servers, etc. for a data center; or a cloud compute node, which can be distributed across one or more data centers.

In at least one embodiment, compute node 1400 can include can include a one or more processor(s) 1402, one or more memory element(s) 1404, storage 1406, network interfaces 1408, control logic 1410 and network function logic 1414. In at least one embodiment, processor(s) 1002 is/are at least one hardware processor configured to execute various tasks, operations and/or functions for compute node 1400 for one or more core slice Type(s)/slice(s) as described herein according to software and/or instructions configured for the compute node. In at least one embodiment, memory element(s) 1404 and/or storage 1406 is/are configured to store data, information, software, instructions, logic (e.g., any logic 1410 and/or 1414), data structures, combinations thereof, or the like for various embodiments described herein. Note that in some embodiments, storage can be consolidated with memory elements (or vice versa), or can overlap/exist in any other suitable manner.

In various embodiments, network interfaces 1408 enable communication between for compute node 1400 for one or more core slice Type/slice and other network elements, systems, slices, etc. that may be present in communication system 100 to facilitate operations as discussed for various embodiments described herein. In some embodiments, network interfaces 1408 can include one or more Ethernet driver(s) and/or controller(s), Fibre Channel driver(s) and/or controller(s), or other similar network interface driver(s) and/or controller(s) to enable communications for compute node 1400 for one or more core slice Type(s)/slice(s) within communication system 100.

In at least one embodiment, control logic 1410 can include instructions that, when executed (e.g., via one or more processor(s) 1402), cause for compute node 1400 for one or more core slice Type/slice to perform operations, which can include, but not be limited to, providing overall control operations of compute node 1400; cooperating with other logic, data structures, etc. provisioned for and/or maintained by compute node 1400; combinations thereof; or the like to facilitate various operations as discussed for various embodiments described herein.

In at least one embodiment, bus 1412 can be configured as an interface that enables one or more elements of compute node 1400 (e.g., processor(s) 1402, memory element(s) 1404, logic, etc.) to communicate in order to exchange information and/or data. In at least one embodiment, bus 1412 may be implemented as a fast kernel-hosted interconnect, potentially using shared memory between processes (e.g., logic, etc.), which can enable efficient communication paths between the processes.

In at least one embodiment, network function logic 1414 can include instructions that, when executed (e.g., via one or more processor(s) 1402) cause compute node 1400 to perform one or more operations for one or more network element(s) associated with each of one or more core slice Type(s)/slice(s) (e.g., an MME server, SAE-GW, PCRF, ICN router, etc.) as discussed for various embodiment described herein.

Referring to FIG. 12, FIG. 12 is a simplified block diagram illustrating example details that can be associated with another mobile core SDN infrastructure 1500 in accordance with one potential embodiment. In at least one embodiment, communication system 100 can be provisioned with different mobile core SDN infrastructure deployments including, but not limited to mobile core SDN infrastructure and/or mobile core SDN infrastructure 1500.

For the embodiment shown in FIG. 12, mobile core SDN infrastructure 1500 can include a number of core slice Type(s)/slices 1522.1-1522.N, an MMF 1524, a slice selector 1526, a core NNSF 1528, and an HSS 1532. During operation, MMF 1524 can interact or otherwise cooperate with slice selector 1526, core NNSF 1528 and/or HSS 1532 to perform slice selection operations (e.g., classifying a subscriber's flow to a particular slice Type) via slice selector 1526 and load balancing operations (e.g., load balancing the flow to a particular slice Type/Slice) via core NNSF 1528. Thus, in various embodiments, any combination of core slice Type selection and/or load balancing operations can be performed internal or external to one or more MMF(s) that may be implemented for communication system 100.

Variations and Implementations

In regards to the internal structure associated with communication system 100, appropriate software, hardware and/or algorithms are being provisioned for UEs (e.g., UE 102.1-102.3, 702, 902 and 1102), RF elements (e.g., RF elements 104.1-104.2, 704.1-704.3, 904.1-904.3, 1104.1-1104.3), MMFs (e.g., MMF 124, 724.1, 724.2, 924.1, 924.2, 1124.1, 1124.2, 1500), an orchestration system (e.g., orchestration system 160), an HSS (e.g., HSS 132 and 1532), an MMF-RF database (e.g., MMF-RF database 730, 930 and 1130), a core NNSF (e.g., core NNSF 1528), a slice selector (e.g., slice selector 1526), compute nodes (e.g., for one or more core slice Type/slices) within communication system 100 in order to facilitate operations as discussed for various embodiments described herein to facilitate slice management in a network environment.

Each of the elements of communication system 100 may couple to one another through simple interfaces or through any other suitable connection (wired or wireless), which provides a viable pathway for network communications. As referred to herein, a physical (wired or wireless) interconnection or interface can refer to an interconnection of one element or node with one or more other element(s), while a logical interconnection or interface can refer to communications, interactions and/or operations of elements with each other, which can be directly or indirectly interconnected, in a network environment.

Additionally, any one or more of these elements may be combined or removed from the architecture based on particular configuration needs. Communications in a network environment can be referred to herein as 'messages', 'messaging', 'signaling', 'data', 'objects', 'requests', 'queries', 'responses', 'replies', etc. which may be inclusive of packets. Generally, signaling is referred to in reference to control-plane or management-plane packets while messaging can be referred to in reference to control-plane, management-plane or data-plane packets exchanged for communications at the application level.

A packet is a formatted unit of data and can contain both control information (e.g., source and destination address, etc.) and data, which is also known as a payload. In some embodiments, control information can be included in headers and trailers for packets. Messages can be sent and received according to any suitable communication protocols. Suitable communication protocols can include a multi-layered scheme such as the Open Systems Interconnection (OSI) Model, or any derivations or variants thereof.

The terms 'data', 'information', 'parameters' and variations thereof as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

In various embodiments, communication system 100 can represent a series of points or nodes of interconnected communication paths (wired or wireless) for receiving and transmitting packets of information that propagate through communication system 100. In various embodiments, communication system 100 can be associated with and/or provided by a single network operator or service provider and/or multiple network operators or service providers. In various embodiments, communication system 100 can include and/or overlap with, in whole or in part, one or more packet data network(s) (e.g., one or more packet data network(s) 170). Communication system 100 may offer communicative interfaces between various elements of communication system 100 and may be associated with any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, Low Power Wide Area Network (LPWAN), Low Power Network (LPN), Machine to Machine (M2M) network, IoT Network, or any other appropriate architecture or system that facilitates communications in a network environment.

In various embodiments, communication system 100 may implement user datagram protocol/Internet Protocol (UDP/IP) connections and/or transmission control protocol/IP (TCP/IP) communication language protocol in particular embodiments of the present disclosure. However, communication system 100 can alternatively implement any other suitable communication protocol, interface and/or standard, proprietary and/or non-proprietary, for transmitting and receiving messaging and/or signaling. Other protocols, interfaces, and/or communication standards that can be used in communication system 100 can include 3GPP Diameter-based protocols, Remote Authentication Dial-In User Service (RADIUS) protocols, Authentication, Authorization and Accounting (AAA) signaling, a Terminal Access controller access-control system (TACACS), TACACS+, Proxy Mobile IP version 6(PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), etc. In some embodiments, secure communications can be facilitated using TCP/IP Secure Sockets Layer (SSL) communications.

In various embodiments, UE 102.1-102.3, 702, 902, and 1102 can be associated with any electronic device seeking to initiate a flow in communication system 100 via some network. In at least one embodiment, any UE 102.1-102.3, 702, 702, 902, and 1102 can be configured to facilitate simultaneous WLAN connectivity and 3GPP connectivity within communication system 100. The terms 'UE', 'mobile device', 'mobile radio device', 'end device', 'user', 'subscriber' or variations thereof can be used herein in this Specification interchangeably and are inclusive of devices used to initiate a communication, such as a computer, an electronic device such as an IoT device (e.g., an appliance, a thermostat, a sensor, a parking meter, etc.), a personal digital assistant (PDA), a laptop or electronic notebook, a cellular telephone, an IP phone, an electronic device having cellular and/or Wi-Fi connection capabilities, a wearable electronic device, or any other device, component, element, or object capable of initiating voice, audio, video, media, or data exchanges within communication system 100. UE 102.1-102.3, 702, 902, and 1102 may also be inclusive of a suitable interface to a human user such as a microphone, a display, a keyboard, or other terminal equipment.

UE 102.1-102.3, 702, 902, and 1102 may also be any device that seeks to initiate a communication on behalf of another entity or element such as a program, application, a database, or any other component, device, element, or object capable of initiating an exchange within communication system 100. Within communication system 100, IP addresses (e.g., for UE 102.1-102.3, 702, 902, 1102, or any other element in communication system 100) can be assigned using Dynamic Host Configuration Protocol (DHCP), Stateless Address Auto-configuration (SLAAC), during default bearer activation processes, or any suitable variation thereof. IP addresses used within communication system 100 can include IP version 4 (IPv4) and/or IP version 6 (IPv6) IP addresses.

In various example implementations, one or more of RF elements (e.g., RF elements 104.1-104.2, 704.1-704.3, 904.1-904.3 and 1104.1-1104.3), MMFs (e.g., MMF 124, 724.1, 724.2, 924.1, 924.2, 1124.1, and 1124.2), an orchestration system (e.g., orchestration system 160), a core NNSF (e.g., core NNSF 1528), a slice selector (e.g., slice selector 1526), and/or compute nodes (e.g., for one or more core slice Type/slices) discussed for various embodiments described herein can encompass network appliances, routers, servers, switches, gateways, bridges, loadbalancers, firewalls, processors, modules, radio receivers/transmitters or any other suitable device, component, element, or object operable to exchange information that facilitates or otherwise helps to facilitate various slice management operations as described for various embodiments discussed herein in a network environment (e.g., for networks such as those illustrated in FIG. 1). In various embodiments, one or more of RF elements (e.g., RF elements 104.1-104.2, 704.1-704.3, 904.1-904.3 and 1104.1-1104.3), MMFs (e.g., MMF 124, 724.1, 724.2, 924.1, 924.2, 1124.1, and 1124.2), an orchestration system (e.g., orchestration system 160), a core NNSF (e.g., core NNSF 1528), a slice selector (e.g., slice selector 1526), and/or compute nodes (e.g., for one or more core slice Type/slices) discussed herein can include software (or reciprocating software) that can coordinate in order to achieve operations associated with providing slice management in a network environment as discussed herein and may include any suitable algorithms, hardware, software, components, modules, logic, clients, interfaces, and/or objects that facilitate the operations thereof. This may be inclusive of appropriate algorithms, communication protocols, interfaces, and/or standards, proprietary, and/or non-proprietary that allow for the effective exchange of data or information.

In various embodiments, one or more of RF elements (e.g., RF elements 104.1-104.2, 704.1-704.3, 904.1-904.3 and 1104.1-1104.3), MMFs (e.g., MMF 124, 724.1, 724.2, 924.1, 924.2, 1124.1, and 1124.2), an orchestration system (e.g., orchestration system 160), a core NNSF (e.g., core NNSF 1528), a slice selector (e.g., slice selector 1526), and/or compute nodes (e.g., for one or more core slice Type/slices) as discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'. Information being tracked or sent to one or more of RF elements (e.g., RF elements 104.1-104.2, 704.1-704.3, 904.1-904.3 and 1104.1-1104.3), MMFs (e.g., MMF 124, 724.1, 724.2, 924.1, 924.2, 1124.1, and 1124.2), an orchestration system (e.g., orchestration system 160), a core NNSF (e.g., core NNSF 1528), a slice selector (e.g., slice selector 1526), and/or compute nodes (e.g., for one or more core slice Type/slices) discussed herein could be provided in any database, data structure, table, register, control list, cache, storage, and/or storage structure: all of which can be referenced at any suitable timeframe. Any such storage options may also be included within the broad term 'memory element' as used herein. Any of potential processing elements, controllers, managers, systems, logic, and/or machines described herein can be construed as being encompassed within the broad term 'processor'. In various embodiments, one or more of RF elements (e.g., RF elements 104.1-104.2, 704.1-704.3, 904.1-904.3 and 1104.1-1104.3), MMFs (e.g., MMF 124, 724.1, 724.2, 924.1, 924.2, 1124.1, and 1124.2), an orchestration system (e.g., orchestration system 160), a core NNSF (e.g., core NNSF 1528), a slice selector (e.g., slice selector 1526), and/or compute nodes (e.g., for one or more core slice Type/slices) discussed herein can also include suitable interfaces for receiving, transmitting, and/or otherwise communicating data or information in a network environment.

Note that in certain example implementations, operations as outlined herein to facilitate slice management in a network environment may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, a memory element and/or storage [as shown in FIGS. 2A and 10-11] can store data, software, code, instructions (e.g., processor instructions), logic, parameters, combinations thereof or the like used for operations described herein. This includes memory elements and/or storage being able to store data, software, code, instructions (e.g., processor instructions), logic, parameters, combinations thereof, or the like that are executed to carry out operations described herein.

A processor (e.g., a hardware processor) can execute any type of instructions associated with data to achieve the operations detailed herein. In one example, a processor [as shown in FIGS. 2A and 10-11] can transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor), and/or one or more the elements identified herein could be some type of a programmable processor, programmable digital logic (e.g., a field programmable gate array (FPGA), a DSP processor, an EPROM, a controller, an electrically erasable PROM (EEPROM), or an ASIC) that includes digital logic, software, code, electronic instructions, or any suitable combination thereof.

One or more advantages mentioned herein do not in any way suggest that any one of the embodiments necessarily provides all the described advantages or that all the embodiments of the present disclosure necessarily provide any one of the described advantages. Note that in this Specification, references to various features (e.g., elements, structures, nodes, modules, components, logic, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein this Specification, can be inclusive of an executable file comprising instructions that can be understood and processed on a computer, processor, machine, compute node combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the communication system 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B, and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of' and 'one or more of' can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 may be applicable to other exchanges or routing protocols, interfaces, and/or communications standards, proprietary, and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims

What is claimed is:

1. A method comprising:
receiving, by a mobility management frontend, an attach request for a user equipment (UE) to attach the UE to a core network slice type for a mobile core Software Defined Network (SDN) infrastructure, wherein a plurality of core network slice types are available for the mobile core SDN infrastructure to receive traffic from a plurality of UEs;
determining a particular core network slice type within the mobile core SDN infrastructure to serve the UE based on subscriber information associated with the UE;
selecting a particular slice instance of the particular core network slice type to receive traffic for the UE;
maintaining a plurality of data structures by the mobility management frontend, wherein the plurality of data structures comprise:
a session correlation table identifying, for each of a particular UE of the plurality of UEs, a first session identifier (ID) assigned to the particular UE by a Radio Frequency (RF) element of a Radio Access Network (RAN) to which the particular UE is connected, a second session ID assigned to the UE by the mobility management frontend, and a third session ID assigned to the particular UE by a Mobility Management Entity server associated with the particular slice instance; and a paging correlation table identifying, for each RF element of a plurality of RF elements of the RAN, a paging location list associated with each RF element; and
forwarding traffic for the UE between the RAN and the particular slice instance by the mobility management frontend.

2. The method of claim 1, wherein determining the particular core network slice type further comprises:
retrieving, by the mobility management frontend, the subscriber information associated with the UE from a Home Subscriber Server (HSS); and
determining the particular core network slice type based on a UE-Usage-Type parameter included in the subscriber information that identifies the particular core network slice type to be selected for the UE.

3. The method of claim 1, wherein selecting the particular slice instance of the particular core network slice type is based, at least in part, on loading for each of a plurality of slice instances associated with the particular core network slice type.

4. The method of claim 1, further comprising:
decrypting a Non-Access Stratum (NAS) message received by the mobility management frontend from the UE; and
forwarding the decrypted NAS message to a Mobility Management Entity (MME) server associated with the particular slice instance.

5. The method of claim 1, further comprising:
receiving an unencrypted Non-Access Stratum (NAS) message by the mobility management frontend from a Mobility Management Entity server associated with the particular slice instance;
encrypting the NAS message; and
forwarding the encrypted NAS message toward the UE.

6. The method of claim 1, further comprising:
receiving a paging message by the mobility management frontend from a Mobility Management Entity (MME) server associated with the particular slice instance, wherein the paging message comprises an identifier for the UE and paging location information associated with the UE;
determining one or more RF elements of the RAN that can be serving the UE from the paging correlation table based on the paging location information received in the paging message; and
forwarding the paging message to the one or more determined RF elements, wherein the forwarded paging message comprises the identifier for the UE.

7. The method of claim 1, wherein the plurality of data structures further comprise:
a mobility management frontend correlation table identifying, for each of a plurality of mobility management frontends, a list identifying a plurality of RF elements of the RAN served by each mobility management frontend.

8. One or more non-transitory tangible media encoding logic that includes instructions for execution by a processor, wherein the execution causes the processor to perform operations, comprising:
receiving, by a mobility management frontend, an attach request for a user equipment (UE) to attach the UE to a core network slice type for a mobile core Software Defined Network (SDN) infrastructure, wherein a plurality of core network slice types are available for the mobile core SDN infrastructure to receive traffic from a plurality of UEs;

determining a particular core network slice type within the mobile core SDN infrastructure to serve the UE based on subscriber information associated with the UE;

selecting a particular slice instance of the particular core network slice type to receive traffic for the UE;

maintaining a plurality of data structures by the mobility management frontend, wherein the plurality of data structures comprise:

a session correlation table identifying, for each of a particular UE of the plurality of UEs, a first session identifier (ID) assigned to the particular UE by a Radio Frequency (RF) element of a Radio Access Network (RAN) to which the particular UE is connected, a second session ID assigned to the UE by the mobility management frontend, and a third session ID assigned to the particular UE by a Mobility Management Entity server associated with the particular slice instance; and a pacing correlation table identifying, for each RF element of a plurality of RF elements of the RAN, a pacing location list associated with each RF element; and forwarding traffic for the UE between the RAN and the particular slice instance by the mobility management frontend.

9. The media of claim 8, wherein determining the particular core network slice type further comprises:

retrieving, by the mobility management frontend, the subscriber information associated with the UE from a Home Subscriber Server (HSS); and determining the particular core network slice type based on a UE-Usage-Type parameter included in the subscriber information that identifies the particular core network slice type to be selected for the UE.

10. The media of claim 8, wherein selecting the particular slice instance of the particular core network slice type is based, at least in part, on loading for each of a plurality of slice instances associated with the particular core network slice type.

11. The media of claim 8, wherein the execution causes the processor to perform further operations, comprising:

decrypting a Non-Access Stratum (NAS) message received by the mobility management frontend from the UE; and forwarding the decrypted NAS message to a Mobility Management Entity (MME) server associated with the particular slice instance.

12. The media of claim 8, wherein the execution causes the processor to perform further operations, comprising:

receiving an unencrypted Non-Access Stratum (NAS) message by the mobility management frontend from a Mobility Management Entity server associated with the particular slice instance;

encrypting the NAS message; and forwarding the encrypted NAS message toward the UE.

13. The media of claim 8, wherein the execution causes the processor to perform further operations, comprising:

receiving a paging message by the mobility management frontend from a Mobility Management Entity (MME) server associated with the particular slice instance, wherein the paging message comprises an identifier for the UE and paging location information associated with the UE;

determining one or more RF elements of the RAN that can be serving the UE from the paging correlation table based on the paging location information received in the paging message; and forwarding the paging message to the one or more determined RF elements, wherein the forwarded paging message comprises the identifier for the UE.

14. The media of claim 8, wherein the plurality of data structures further comprise:

a mobility management frontend correlation table identifying, for each of a plurality of mobility management frontends, a list identifying a plurality of RF elements of the RAN served by each mobility management frontend.

15. A system comprising:

at least one memory element for storing data; and at least one processor for executing instructions associated with the data, wherein the executing causes the system to perform operations, comprising:

receiving, by a mobility management frontend, an attach request for a user equipment (UE) to attach the UE to a core network slice type for a mobile core Software Defined Network (SDN) infrastructure, wherein a plurality of core network slice types are available for the mobile core SDN infrastructure to receive traffic from a plurality of UEs;

determining a particular core network slice type within the mobile core SDN infrastructure to serve the UE based on subscriber information associated with the UE;

selecting a particular slice instance of the particular core network slice type to receive traffic for the UE;

maintaining a plurality of data structures by the mobility management frontend, wherein the plurality of data structures comprise:

a session correlation table identifying, for each of a particular UE of the plurality of UEs, a first session identifier (ID) assigned to the particular UE by a Radio Frequency (RF) element of a Radio Access Network (RAN) to which the particular UE is connected, a second session ID assigned to the UE by the mobility management frontend, and a third session ID assigned to the particular UE by a Mobility Management Entity server associated with the particular slice instance; and a paging correlation table identifying, for each RF element of a plurality of RF elements of the RAN, a paging location list associated with each RF element;

and forwarding traffic for the UE between the RAN and the particular slice instance by the mobility management frontend.

16. The system of claim 15, wherein determining the particular core network slice type further comprises:

retrieving, by the mobility management frontend, the subscriber information associated with the UE from a Home Subscriber Server (HSS); and determining the particular core network slice type based on a UE-Usage-Type parameter included in the subscriber information that identifies the particular core network slice type to be selected for the UE.

17. The system of claim 15, wherein the executing causes the system to perform further operations, comprising:

receiving a paging message by the mobility management frontend from a Mobility Management Entity (MME) server associated with the particular slice instance, wherein the paging message comprises an identifier for the UE and paging location information associated with the UE;

determining one or more RF elements of the RAN that can be serving the UE from the paging correlation table based on the paging location information received in the paging message; and forwarding the paging message to the one or more determined RF elements, wherein the forwarded paging message comprises the identifier for the UE.

* * * * *

UNITED STATES PATENT AND TRADEMARK OFFICE
CERTIFICATE OF CORRECTION

PATENT NO. : 10,178,646 B2  
APPLICATION NO. : 15/486143  
DATED : January 8, 2019  
INVENTOR(S) : Hendrikus G. P. Bosch et al.

It is certified that error appears in the above-identified patent and that said Letters Patent is hereby corrected as shown below:

On the Title Page

Item (72), in Column 1, in "Inventors", Line 4, delete "Jurriĕn" and insert -- Jurriën --, therefor.

In the Claims

In Column 33, Line 21, in Claim 8, delete "pacing" and insert -- paging --, therefor.

In Column 33, Line 23, in Claim 8, delete "pacing" and insert -- paging --, therefor.

Signed and Sealed this  
Twenty-seventh Day of August, 2019

Andrei Iancu  
*Director of the United States Patent and Trademark Office*